(12) United States Patent
Rabin

(10) Patent No.: US 10,509,648 B2
(45) Date of Patent: Dec. 17, 2019

(54) CLASSIFICATION AND DISPLAY OF CODE EXECUTION PROFILE DATA

(71) Applicant: Nintendo Co., Ltd., Kyoto (JP)

(72) Inventor: Steve Rabin, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 114 days.

(21) Appl. No.: 14/249,514

(22) Filed: Apr. 10, 2014

(65) Prior Publication Data

US 2015/0293761 A1 Oct. 15, 2015

(51) Int. Cl.
*G06F 8/77* (2018.01)

(52) U.S. Cl.
CPC .................................. *G06F 8/77* (2013.01)

(58) Field of Classification Search
CPC ........................................................ G06F 8/77
USPC ........................................................ 717/120
See application file for complete search history.

(56) References Cited

U.S. PATENT DOCUMENTS

| | | | |
|---|---|---|---|
| 2002/0087613 A1* | 7/2002 | Harif | G06Q 30/02 718/104 |
| 2007/0198971 A1* | 8/2007 | Dasu et al. | 717/140 |
| 2007/0226222 A1* | 9/2007 | Yamamoto | G06Q 10/10 |
| 2010/0100867 A1* | 4/2010 | Sindhgatta et al. | 717/105 |
| 2011/0257896 A1* | 10/2011 | Dowds et al. | 702/20 |
| 2012/0284691 A1* | 11/2012 | Aljammaz et al. | 717/120 |
| 2013/0145349 A1* | 6/2013 | Basak et al. | 717/121 |
| 2013/0290238 A1* | 10/2013 | Griffith et al. | 706/47 |

OTHER PUBLICATIONS

Multi-Level Pie Chart on Wikipedia: Page: http://en.wikipedia.org/wiki/Pie_chart; Image: http://en.wikipedia.org/wiki/File:Disk_usage_(Boabab).png; downloaded Apr. 9, 2014.
Protovis Sunburst Charts; http://www.biostars.org/p/68102/; downloaded Apr. 9, 2014.
Multi-level Pie Chart; http://www.fusioncharts.com/chart-primers/multi-level-pie-chart/; downloaded Apr. 9, 2014.
Comprehensive Suite of Advanced Data Visualizations; http://www.datawatch.com/products/datawatch-desktop/data-visualizations/pie-charts; downloaded Apr. 9, 2014.
Sunburst Chart; http://www.aculocity.com/SunburstChart.aspx; downloaded Apr. 9, 2014.
A Tour Through the Visualization Zoo; http://hci.stanford.edu/jheer/files/zoo/; downloaded Apr. 9, 2014.

* cited by examiner

*Primary Examiner* — Chat C Do
*Assistant Examiner* — Bradford F Wheaton
(74) *Attorney, Agent, or Firm* — Nixon & Vanderhye, P.C.

(57) ABSTRACT

Methods for classifying functions as belonging to a particular software system is disclosed. Various embodiments are also described that use and display the result of the function classification in various ways, regardless of whether the information was generated by any particular of the described methods. One example graph combines function membership data, time interval frame data, and call stack profile data in the form of an Icicle Graph. The Icicle Graph is then distorted into a Sunburst Graph, resulting in an overall Software System Sunburst Icicle Graph.

22 Claims, 20 Drawing Sheets

|  | Frame 1 | Frame 2 | Frame 3 | Frame 4 | Frame 5 | Frame 6 |
|---|---|---|---|---|---|---|
| Physics System | 30ms | 15ms | 10ms | 25ms | 5ms | 20ms |
| GetTrajectory | 10ms | 5ms | 5ms | 10ms | 5ms | 10ms |
| CalcAngle | 10ms | 10ms | 10ms | 15ms | 15ms | 10ms |

1400

1401 — Physics System
1402 — GetTrajectory
1403 — CalcAngle

Pearson Product-Moment Correlation Coefficient
0.88 = Correlation between GetTrajectory and Physics System
-0.21 = Correlation between CalcAngle and Physics System

Conclusion:
1. The function GetTrajectory is likely a member of the Physics System.
2. The function CalcAngle is likely NOT a member of the Physics System.

Figure 14

Call Tree over Time with Functions Colored based on a Single System's Belief Percentage

CLASSIFICATION AND DISPLAY OF CODE EXECUTION PROFILE DATA

BACKGROUND

We affiliate ourselves with things in our daily lives. Whether it is our place of employment, the school we attend, or the religion we associate with, these affiliations define us and tell something about who we are. These affiliations can also classify us as belonging to a particular group. For example, one would classify an individual that has a Juris Doctor and that works for a law firm as most likely being a lawyer.

These classifications can be useful to tell us something about someone without having any knowledge of the person. It would also be helpful to classify a software program in a similar manner in order to determine which parts of the program are affiliated with a particular software system (without having any prior knowledge of the code).

BRIEF DESCRIPTION OF THE DRAWINGS

FIG. 14 shows a non-limiting example of how two unclassified functions can be compared with systems to determine correlations;

DETAILED DESCRIPTION OF EXAMPLE NON-LIMITING EMBODIMENTS OF THE TECHNOLOGY

Software profilers aid in analyzing the dynamic behavior of a computer program (e.g., for optimizing the program's performance or finding bugs or other problems). Commonly-assigned U.S. application Ser. Nos. 12/533,845, 12/534,048, and 14/165,818 (also incorporated herein by reference) describe example profilers. This disclosure describes a way to improve upon current software profiler systems in order to classify and display software execution in a program.

Understanding code execution profile data is difficult given that millions of data points are recorded consisting of thousands of functions. One way to simplify the results is to classify functions as belonging to one of a smaller set of different software systems within the program. For example, in the field of simulation or video game programs, the software systems might consist of (although not limited to) physics, animation, artificial intelligence, particle effects, graphics, audio, online, memory, job system, and/or math. The profiler can auto-categorize all recorded functions and its associated data into one of these systems and display aggregate results without user intervention or mark-up of the original source code. The technology described in this application discloses a method to achieve this auto-classification along with new techniques for graphical display.

While there are a variety of methods for classifying functions, the technology of this application is directed to at least three methods for classifying functions as belonging to a particular software system, which can be used independently or in conjunction with each other. Furthermore, the technology of this application is directed to how to use and display the result of the information, regardless of whether the information was generated by the described methods. Finally, this application describes a type of graph called a Sunburst Icicle Graph that combines function membership data, time interval frame data, and call stack profile data in the form of an Icicle Graph. The Icicle Graph is then distorted into a Sunburst Graph, resulting in an overall Software System Sunburst Icicle Graph.

Example Software Profiling System

Figure 1:
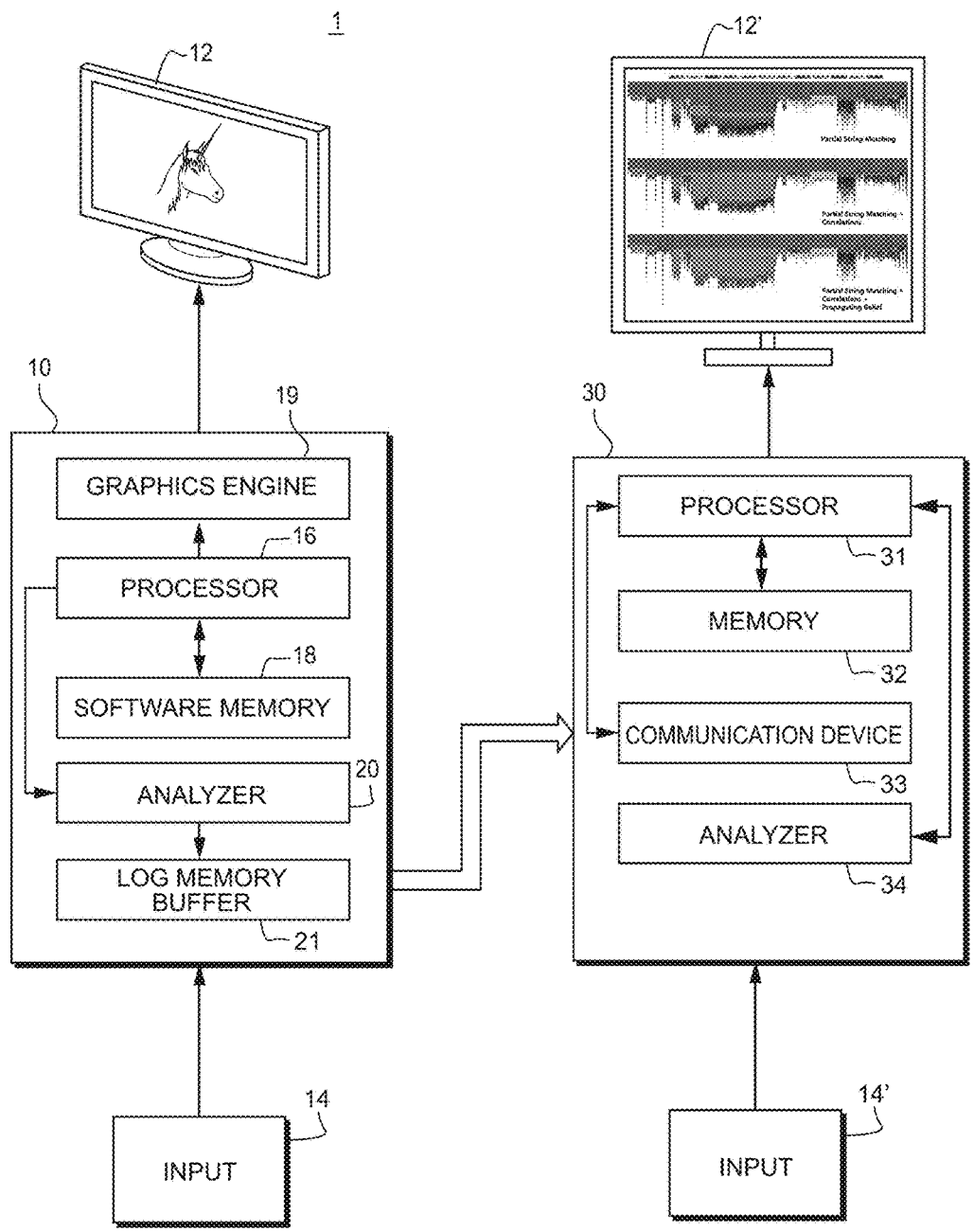
FIG. 1 is a block diagram showing an illustrative non-limiting implementation of a software profiling system.

FIG. 1 is a block diagram showing an illustrative non-limiting implementation of a software profiling system 1, which can include, for example, an embedded computing device. The software profiling system 1 can be used, for example, in classifying and displaying software execution in a program. Although example software profiling system 1 can be specifically used for analyzing video game software, it should be understood that it can profile any type of software. System 1 runs functions while also providing analysis. The system 1 includes a computing system 10 connected to a display 12 (or display device 12) and an input device 14. The computing system 10 includes a processor 16, which can execute a video game or other program. The game or other program can be stored in a non-transitory game software memory 18. System 1 further includes a graphics engine 19 that generates graphics for display on the display 12. The system 1 is not limited to a single processor or memory, but can comprise multi-core architecture, multiple processors and/or multiple memories, and/or remotely accessed network (e.g., cloud) computing components. Input from input device 14 can affect/control program execution.

The graphics engine 19 includes a frame buffer memory that composes images periodically at a frame rate (e.g., every $\frac{1}{30}^{th}$ or $\frac{1}{60}^{th}$ of a second) and reads out the images for display on the display 12. Frame refresh rate may be controlled by a timer that interrupts the processor 16 periodically or non-periodically. Display 12 may output audio/video data from the program being executed on system 10.

The computing system 10 can further include an analyzer 20 used in gathering the program execution data when the processor 16 executes a software program. The analyzer 20 can be implemented in any combination of software, hardware, and firmware. In one non-limiting illustrative embodiment, the analyzer 20 is a form of a software profiler that monitors a sequence of operations performed by the processor 16 while the processor executes the software program. The analyzer 20 collects data, which may specify various functions that are called during the execution of the software program, and their addresses, which in turn indicate where in the memory program the instructions are stored, as well as counts of times particular functions are called. The analyzer 20 can store the collected data in a non-transitory log memory buffer 21.

The system 1 also includes a software analysis device 30 (or information processing apparatus 30) capable of communicating with the computing system 10 via a communications device 33, for example. The data that is stored in the log memory buffer 21 can be conveyed to the software analysis device 30. The software analysis device 30 is also configured to have a processor 31 for analyzing the execution of a software program and a non-transitory memory 32 capable of storing a program for analyzing the execution of a software program. Likewise, the device 30 can be in communication with an input 14' and a display 12'.

The analysis device 30 is also configured with an analyzer 34 that can analyze the dynamic program behavior of a software program based on the analysis data provided from the computing system 10. Any of the components shown in system 1 could be incorporated in system 10 and/or on a remote system connected via a network (e.g., in the cloud or datacenter).

Display 12' can display a visualization of the analysis being performed by device 30. For example, a user can play a video game using system 10 where the game is displayed on display 12 while device 30 analyzes the gameplay and displays a visualization on display 12'. The technology is not limited to separately displaying these items and the same information can be conveyed on a single display or across a multitude of displays.

FIGS. 2-6 show various methods to visualize the data generated by the methods employed, at least, by system 1. The Icicle Graph (shown in FIGS. 2A-C) colored with multiple software system classifications is very practical and useful while the Software System Sunburst Icicle Graph (shown in FIGS. 3-6) are innovative and exciting visualizations. These visualizations are powerful in that with absolutely no numbers they expose a tremendous amount of information that is typically not fully understood by the authors of the code. Additionally, this graphical representation can be used as a fingerprint of the code execution and gives great insight as to the character and behavior of a program.

At least three general methods are employed to classify which functions in a software program should be assigned to a particular group. The first observation is that out of thousands of functions in a running program, there are some functions which might have been named appropriately based on what system it belongs to. For example, a function that is related to the Audio system might have a related word such as "decibel" embedded in the function name, such as the function name SetDecibelLevel. Given this observation, string matching all functions to a list of related words per system will result in a subset of the functions being marked as related to that system. The belief of membership for a given system can be assigned based on the strength of the partial string match of the function name.

Figure 2A:
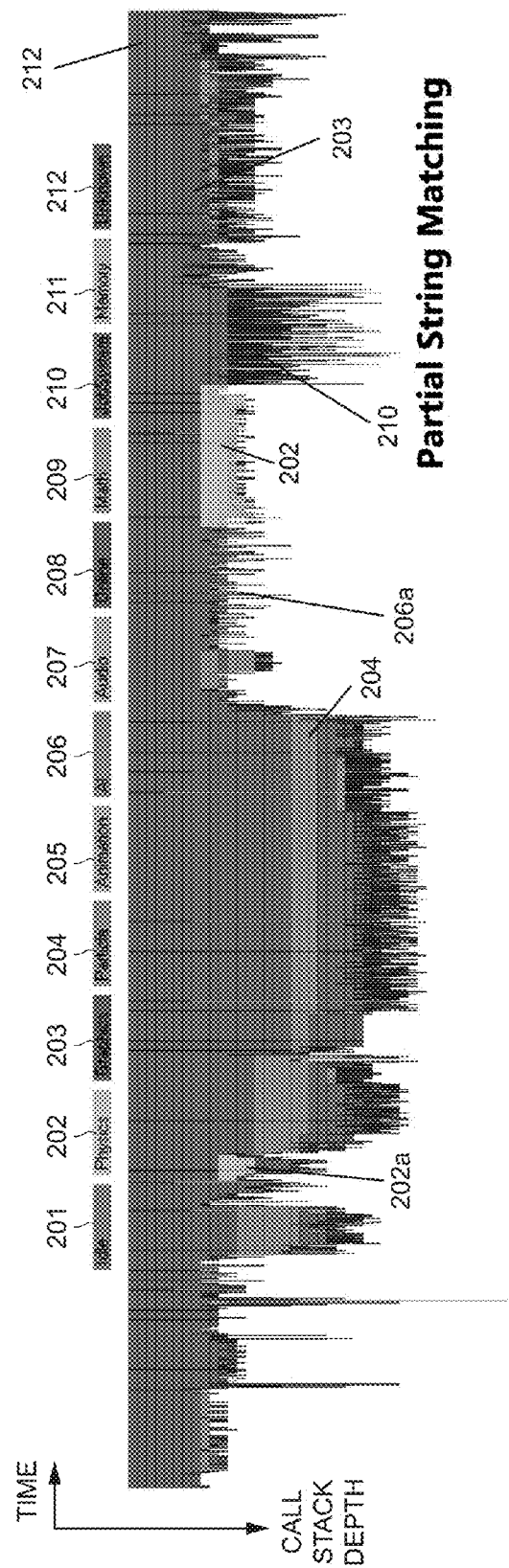
FIGS. 2A-C show non-limiting examples of graphs employing the methods of the software profiling system.

FIG. 2A shows a non-limiting example of the first method using partial string matching That is, functions are classified as belonging to a software system (e.g., Graphics, Physics, Audio) by using partial string matching where membership belief (e.g., on a scale of 0% to 100%) is assigned based on match strength. For example, a function that is named SetDecibelLevel would most likely be classified as an "Audio" function because of the string portion "decibel" in the function name. This matching could be performed using regular expressions and/or dictionary matching of certain terms and the matching can be performed on at least the function name, function parameters, and/or certain variables and definitions (e.g., classes and structures) in the function.

FIG. 2A shows several example classified portions including, but not limited to, idle 201, physics 202, graphics 203, particle effects 204, animation 205, artificial intelligence (AI) 206, audio 207, online 208, math 209, job system 210, memory 211, and unknown 212. As can also be seen in FIG. 2A, there are several portions/functions in the graph classified as unknown 212. In this example, this classification is due to a particular function not having a discernable enough description in the function name and/or parameters to be assigned to any particular class.

The Icicle Graph is configured to show this classification of software and its execution over time in one axis with the call stack depth along another axis. For example, for any given period of time, the classification would show which functions along the call stack most relate to one class or another based on an assigned membership belief.

Furthermore, and as a corollary to this partial string matching technique, if a function's arguments/parameters match a word related to a system, this function may be related to a lesser degree to a particular system. For example, the function GetObject(Camera*object) might be related to the Graphics system because the related word "camera" appeared in the arguments. This lesser degree of relatedness may be represented by assigning a lesser membership belief value to this function for the given system. In this example, there may be a 50% belief that the function GetObject (Camera*object) is related to the Graphics system, with 50% being an arbitrary belief less than 100%.

The membership belief strength may be assigned based on several factors. For example, multiple matches within the function name or arguments should result in higher belief. Likewise, relative match position within a function name or arguments should affect belief with higher belief values toward the beginning of the name. Similarly, matches in the function name should result in higher belief versus matches in the function arguments. It should also be appreciated that the term argument is used to describe the values inside the function string representing certain elements used in calling the function. The term "argument" can also be referred to with the term "parameter."

The system can also employ partial string matching which involves case sensitive or case insensitive requirements. For example, the Artificial Intelligence system might require a case sensitive match of "AI" whereas a match of "ai", "Ai", or "aI" is not considered a match, as those permutations might match unrelated words such as the word "paid" or "Aid." Partial string matching can also require that the word be at the start of the function name, end of the function name, or somewhere in the middle. For example, if a common code library is known to start with particular letters such as "AX," then the match would require those to occur as the start of the string, as in the example "AXProcessData." As a further requirement, string matching might require that a particular string is found, but not when preceded or followed by another string. For example, the Physics system might require a case insensitive match to "phys" but not when followed by the string "ical" (since "physical" might not relate to the Physics system, as in the memory term "physical address"). Furthermore, there might be a list of negative string matches that would disqualify a function name from matching to a particular system. For example, the animation system might have a partial string match with the word "pose" but not if the word "camera" also matches. In general, any kind of string matching that can be done with a regular expression with the addition of a negative disqualification regular expression would be applicable.

A user can also alter the partial string matching requirements in order to better classify functions. This would involve exposing the string matching rules to the user and allowing them to alter the rules, add new rules, or delete existing rules. Additionally, the user could be allowed to define new system classifications and their associated rules. For example, if the user wanted to track all math related functions, they could add a Math system classification and add rules to positively identify such functions, such as partially matching with the words "math" or "sqrt."

Figure 2B:
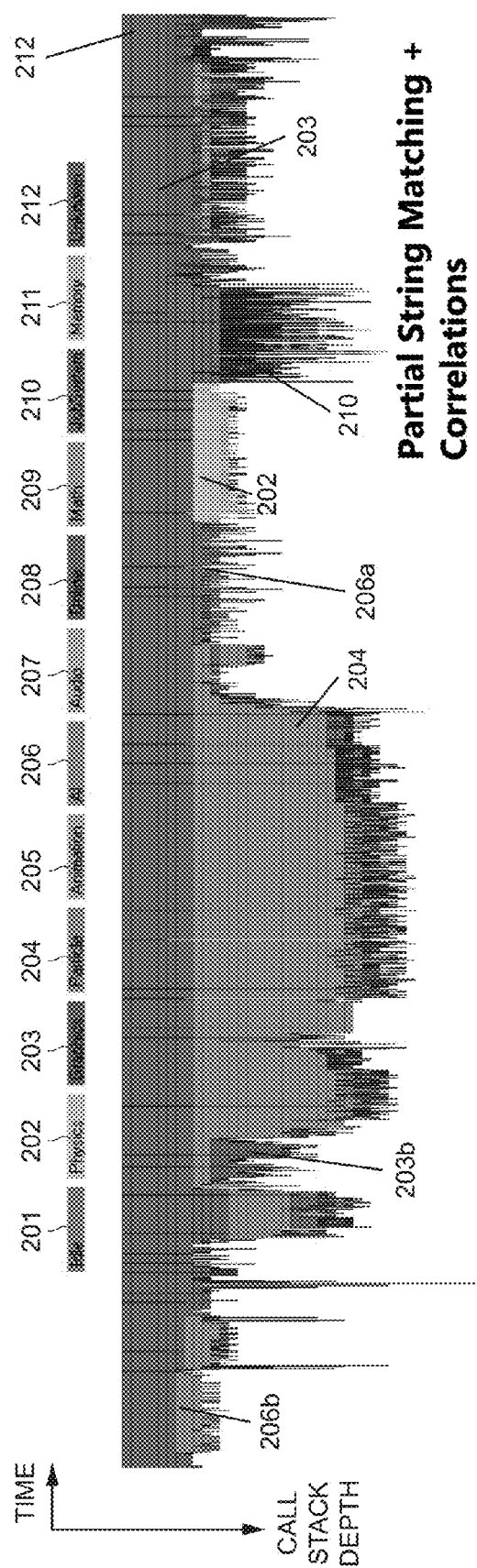

FIG. 2B shows a non-limiting example Icicle Graph classification using the partial string matching technique as well as classifying functions based on correlations. In this example, there is an attempt to classify functions that were not matched using the partial string matching technique by finding strong correlations to matched functions (e.g., correlating function execution time separated into predefined time intervals). For example, if an unclassified function correlates highly with the functions classified as belonging to the Graphics system, then this unclassified function is likely a member of the Graphics system. Membership belief is assigned accordingly, for example, based on the strength of the correlation.

In more detail, after the partial string matching technique is complete, a combination of statistical profile data and classifications can be used to further classify functions that did not string match a particular system. This can be accomplished by looking for correlations between all function behavior within a given classification and each remaining unclassified function. Given the functions that belong to a particular classification system (Graphics, Animation, etc.), the system can calculate the amount of time these functions cumulatively executed for within predefined time periods (for example, with the time periods possibly being the video display frame rate in the field of simulation or video game software). This would result in a list of execution times in seconds, with the list being as long as the number of predefined time periods. For example, if the software profile contained 34 video display frames, then the list would contain 34 execution times (partial frames at the beginning and end of the profile are discarded). Going through this process for each system would provide a list of execution times for each classification system.

Each unclassified function could then be analyzed for its execution time within the same predefined time periods. Furthermore, each unclassified function's execution time list could be mathematically correlated with each of the classification system's lists. Various techniques exist for determining correlation, such as the Pearson Product-Moment Correlation Coefficient, Spearman's Rank Correlation Coefficient, or the Kendall Tau Rank Correlation Coefficient, for example. If the correlation is strong enough beyond a predetermined threshold, the function will be classified as belonging to the highest correlating classification system. The belief associated with this classification can be predefined at either 100% or something smaller such as 95% or 50% as an absolute value, for example. However, the belief can also be assigned based on the correlation strength, such that the belief could be equal to the computed correlation coefficient.

Correlation classification is effective because various systems fluctuate in total execution time over the course of a profile. If an unclassified function fluctuates in the same manner, then it likely belongs or is very closely related to the given system. However, this technique may not be as effective if systems are not sufficiently independent from each other and should not be used to differentiate between systems that are too closely related.

FIG. 2B is thus capable of showing a higher belief that certain functions belong to a particular class when compared to FIG. 2A. For example, particle effects 204 and AI 206a and 206b are shown with greater area in FIG. 2B than in FIG. 2A. Likewise, physics processing 202a in FIG. 2A is now shown as graphics processing 203b in FIG. 2B. These changes occur because there was an initial "belief" that the function belonged to a particular (or no) class when the function was originally classified and the correlation technique refines this "belief." In this example, the partial string matching led to a belief that the portion covered by 202a (in FIG. 2A) was physics 202 where the belief is now that it is instead graphics 203.

For all functions that were assigned system membership belief using the partial string matching and correlation, this belief is then spread up and down the call stack through parent/child relationships that were recorded within the profile. For example, the relationships and/or relative execution times of the parent/child are used to assign belief accordingly. Having classified a portion of functions as having a belief of membership in each system, the highest belief is used to classify the function. A proportion of functions may remain unclassified if they have zero membership belief for all systems. Function classifications are used to come up with an absolute or proportional time spent within each system during program execution (e.g., over all functions running, 40% of time was spent in Graphics, 20% of time was spent in Animation, 5% of time was spent in Physics).

Figure 2C:
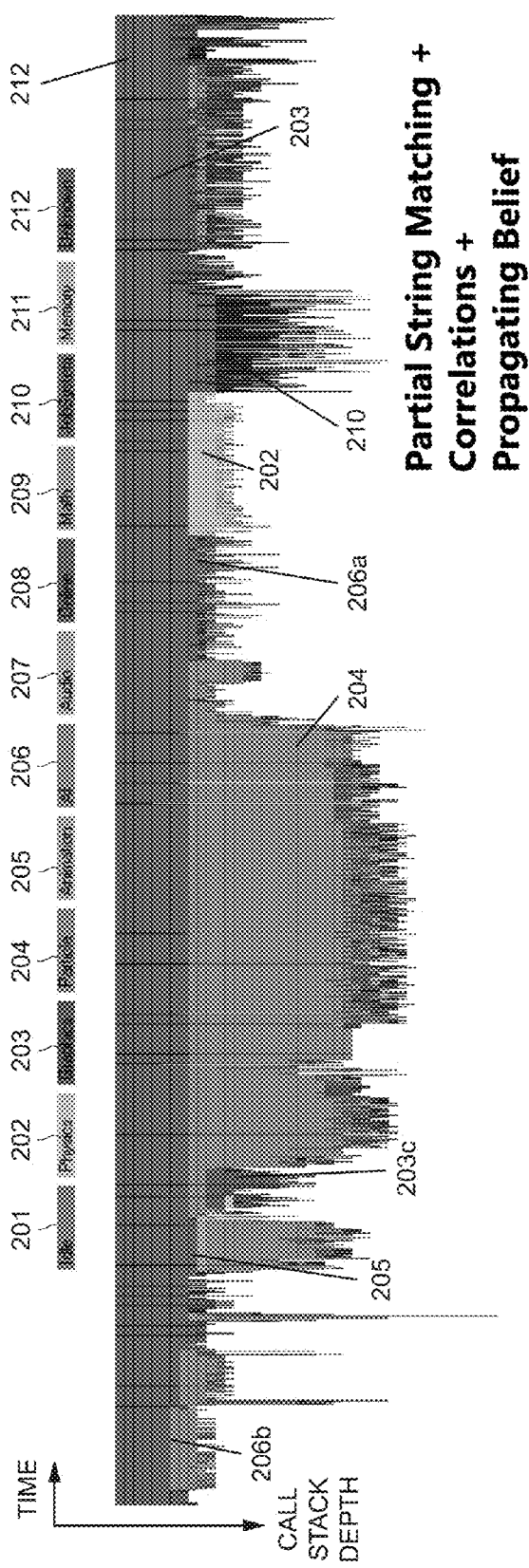

Function classifications are used to color code visual representations of the profile data to allow easy visual inspection of system behavior as shown, for example, in FIG. 2C. Individual function data can be colored, as well as aggregate call stack behavior in the form of Icicle Graphs or Sunburst Icicle Graphs.

FIG. 2C helps illustrate another key observation. In particular, a profile contains call stack information that relates one function to another in the form of parent/child function calling relationships. If a given function is related to a particular system, then the functions it calls might also be related. Similarly, if a given function is related to a particular system, then the function that called it might also be related. These relationships can be used to propagate belief up and down the call stack, emanating from positively identified functions using either the partial string matching technique, the correlation technique, or both. As the belief is propagated up and down the call stack, belief should be discounted the farther it travels from the original source.

As a corollary to this observation, the profiler data contains information on the execution time for each function. For example, if the function CheckForCollisions took 4 ms of total time within itself and its child functions, and if the function it called, CompareObjects, took 1 ms total time, then the relationship between the two is known (i.e., that the child took 25% of the parent's time). This can be extrapolated to suggest that the child function is 25% related to the parent function's purpose. If the parent function is related 100% to the Physics system, based on the initial partial string matching technique or correlation technique, then the child function might be believed to be 25% related to the Physics system, based on the percentage of time the child took relative to the parent. This process of spreading belief can then proceed recursively to each parent and child function.

When spreading belief, there can be reasons to prohibit propagation if certain conditions are met. For example, when spreading belief from child functions to parent functions, it might be desirable to use a threshold test as a gate to prevent propagation. For example, if the child takes less than 50% of the parent function's time, then it might be reasoned that the child function should not spread its belief at all to the parent, since the child does not execute a majority of the parent's workload. Threshold gates can also be used to stop propagation from a parent to its children. These threshold gates can be useful to stop the propagation of belief when it is reasoned that the influence is too low.

In addition to using observed execution time to determine the portion of belief propagation, a distance based approach could also be employed based on a mathematical or hand crafted response curve. For example, belief might be halved with each propagation so that a function with 100% belief would propagate 50% to its parent and 50% to each of its children. In turn, the 50% belief from each child would propagate 25% belief to each of its children, and so on. Similarly, the parent with 50% belief would propagate 25% belief to its parent, and so on, and 25% belief to each of its children, and so on. By using a mathematical or a hand crafted response curve, different propagation effects can be achieved. For example, perhaps the first 3 propagations are each reduced by 20% and then no belief is propagated beyond those 3 propagations.

When belief is propagated it can either be additive with whatever belief already exists for that function for a given system, or it can be forced to only increase belief by replacing lower belief values for a given system (which is effectively taking the max of the current belief and the new belief). When the additive method is used, it can either be capped to 100% or allowed to grow beyond 100%. As an example of the additive method with belief capped at 100%, a function with 80% belief that then receives a propagation of 30% belief would add the two and cap out at 100% belief. Then that 30% belief would be further propagated to parents and children that have not yet been exposed to this new belief. As an example of the "Max Method" of belief propagation, a function with 80% belief that then receives a propagation of 30% belief would then take the max of the two beliefs, which would be 80%. Since the new belief is not greater than the old belief, then there is no reason to propagate the original 30% belief to the parent or children.

FIG. 2C shows a non-limiting example of the Icicle Graph showing the propagation of such beliefs. As compared to FIG. 2B, FIG. 2C has a relatively similar amount of unknown 212 classifications and shows similar classifications particle effects 204, artificial intelligence (AI) 206, physics processing 202, job system 210, and graphics processing 203. But, FIG. 2C refines certain classifications when compared to FIG. 2B by the propagation of belief along the call stack. For example, the portion shown as physics processing 202a in FIG. 2A, and graphics processing 203b in FIG. 2B, is now shown as a combination having both physics and graphics processing 203c. Likewise, AI 206 is shown further down the call stack in FIG. 2C while animation processing 205 is shown in combination with particle processing 204. This could occur, for example, due to the relationship between the classifications. For example, particle processing and graphics processing are two very interrelated classes. The same could be said for physics processing and graphics processing. Thus, it would make sense that the display would show them in close proximity along the call stack as one function may execute processing for one classification where another function could execute processing for the related classification.

It should be appreciated that when the entire process of partial string matching, correlation, and call graph belief propagation is complete, functions will have varying levels of belief per system. Those levels of belief can further be used to visualize or analyze the profile data. It might also be desirable to identify a function as belonging to a single system. Given that a function might have belief values for several systems, the function can be classified using the system with the highest belief. In the event of a tie between two beliefs, a fixed priority of systems can be used as a tie breaker. For example, if belief in Physics and Animation is both at 80%, then a priority system can be used, for example, to always favor Physics over Animation. Thus, the function would be classified as belonging to the Physics system. Another approach to breaking ties is to prioritize the match words individually, rather than the system they are associated with. For example, the match word "graphics" for the Graphics system might be priority 1, the match word "pose" for the Animation system might be priority 2, and the match word "camera" for the Graphics system might be priority 3. In this example, the function GraphicsPose would match the Graphics system and the function CameraPose would match the Animation system. It should be appreciated that these tie-breaking scenarios are non-limiting, and that a variety of different techniques for breaking ties could be used.

It should be appreciated that at least one use of having system classifications per function is to take the call tree generated from the profile data and use the belief values to identify how long each system executed. For example, to analyze the time taken by a particular system, the system can start at the root node and recursively travel down the call tree, stopping at any node that has a belief equal to or higher than some threshold, such as 80% or even 100%. When the system reaches a stopping node, the total time taken by that function and every function it calls is accumulated. By using this method, the system can determine, for example, that the Physics system took a cumulative 30% over the duration of the profile.

Another use is to track the percent of time each system took as a percentage of a given time period, such as a game frame. For each call stack data point recorded, if any function within the call stack contains a belief equal to or higher than some threshold, such as 80% or 100%, then the system can attribute that recorded data to belonging to the system. Using such a method, the system can determine that a particular system took a particular percentage of time during that time period. If this is repeated for many adjacent time periods, the system can obtain a series of percentages that show the load for a given system across many time periods. Such a data set might look like [e.g., 30%, 31%, 29%, 50%, 32%], showing that the system took a much larger amount of time during the $4^{th}$ time period. This data set could be then visually graphed and further analyzed.

A further use of the belief data can be used to color code a graph of the call stack data over time based on which system a function belongs to. The color of a given function can be determined by the highest belief or by a combination of beliefs. The color of a given function can also be modified based on the belief value. For example, higher beliefs might result is brighter colors or more saturated colors.

Figure 3:
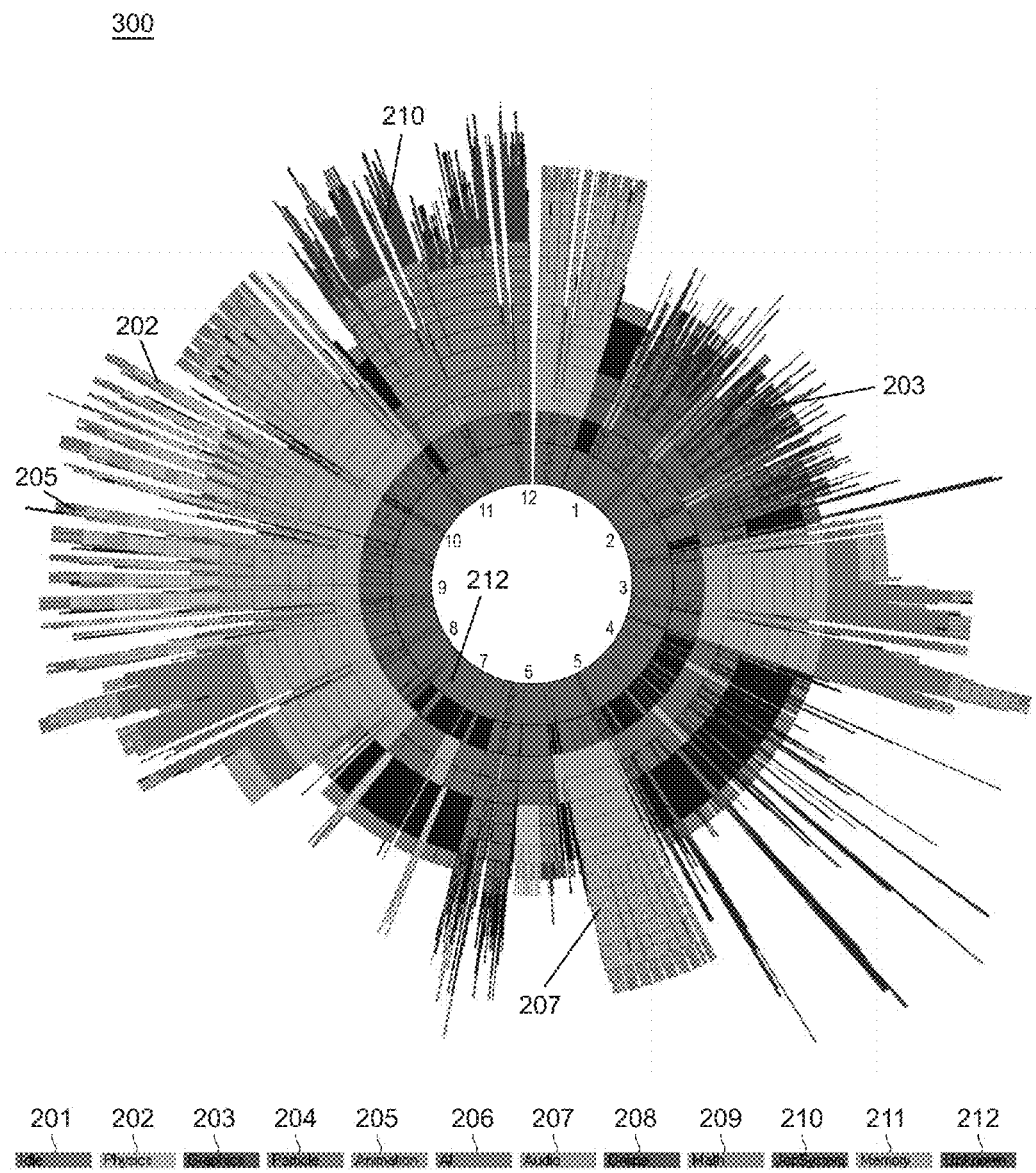
FIG. 3 shows a non-limiting example graph.

FIG. 3 shows a non-limiting example Sunburst Icicle Graph 300. As a non-limiting example, the Icicle Graph styles of FIGS. 2A-C are distorted using polar coordinates and further distorted so that all rings have equal area. The 360 degrees of the circle represent one time interval, such as a simulation video frame. The graph can be read starting at the 12 o'clock position, then proceeding by traveling clockwise around the circle with the progression of time. The inner most ring represents the root of the call stack that was recorded during a profile, while the rings at the outermost tips are the leaves of the recorded call stack. The colorings represent the various software systems.

Similar to the graph shown in FIGS. 2A-C(although not necessarily reflecting the same execution as shown in FIGS. 2A-C), the Sunburst Icicle Graph 300 shows the classification of function execution over time (rotating in a clockwise fashion). The Graph is configured to show the different classifications (e.g., color coded).

In the example shown in FIG. 3, the graph shows graphics processing 203 executing approximately between the 1-o'clock position to 3-o'clock position, shows audio processing 207 executing approximately between the 5-o'clock position and the 6-o'clock position, and job system 210 at approximately between the 11-o'clock position to 12-o'clock position. Similar to FIG. 2C, animation processing 205 and physics processing 202 are shown along the same call stack approximately between the 9-o'clock to 10-o'clock positions. FIG. 3 thus shows a similar representation of function classification as FIGS. 2A-C, but displayed in a radial fashion and extending out at portions to appear as though the sun literally has burst. By displaying the graph along a clock-like rotation, the viewer is left with a sense of function classification during the various times in that period.

Figure 4:
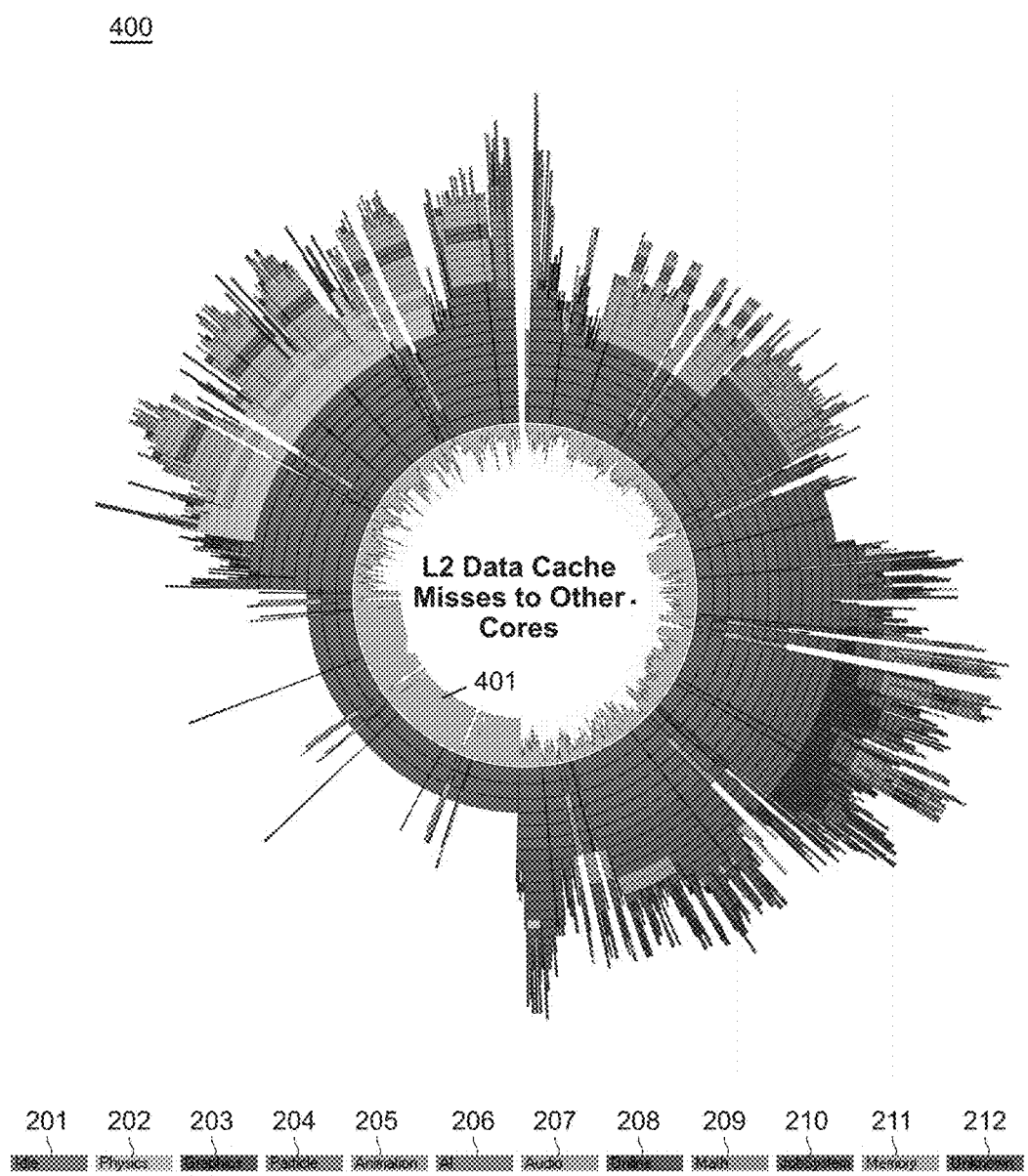
FIG. 4 shows a non-limiting example graph.

FIG. 4 shows another non-limiting example of a Sunburst Icicle Graph 400 but also showing data cache misses 401 to various cores by circumscribing a second set of data on the interior circle that was recorded at the same time as the original profile. In this example, additional data recorded from the CPU performance counters, namely L2 Data Cache Misses to Other Cores 401 is shown on the interior circle. There is a correlation between the two sets of data (CPU performance counter and icicle graph) that can then be visually examined. It should be appreciated that, in this example, the Misses 400 show how many times the processor is trying to find something in memory, and an act of missing causes a spike in the display. This display can thus show where the program may have been waiting relative to the type of function being called. It should be appreciated that a count of cache misses are not the only system information capable of being displayed. For example, the display could also show branch miss predictions during instruction processing of the CPU, among many other possibilities.

FIG. 4 thus shows a CPU counter based graph that could be circumscribed inside a Sunburst Graph. The graphs are not limited to showing CPU counters and can also show other metrics including, but not limited to, number of cycles, number of floating point instructions, number of instructions completed, number of integer operations, number of load/store instructions, percentage of floating point, percentage of integer, percentage of load/store, instructions per cycle, number of all branches, number of correctly predicted branches, number of fall-through branches, number of mis-predicted branches, number of predicted branches taken, number of conditional branches, number of unconditional branches, number of unresolved branches, percentage of correctly predicted branches, percent of mis-predicted branches, number of BPU cycles from inability to process new branches, number of BPU cycles stalled from LR/CR dependencies, number of cycles, number of second branch stall cycles, percentage of stall branch dependency, percentage of stall minimum, percentage of stall successive branches, percentage of stall to many branches, number of L1 D-cache misses, number of L1 I-cache misses, number of L2 cache hits, number of L1 cast outs, number of L2 cast outs, number of total L1 cache misses, number of total L2 cache misses, number of cycles, number of instructions completed, number of L2 D-cache misses, number of load/store instructions, percentage of L2 data misses, percentage of load/store instructions, number of instructions completed, number of L2 data misses, number of L1 cache load misses, number of memory wait cycles, percentage of memory wait time, percentage of L2 D-cache misses to memory, percentage of L2 D-cache misses to other cores, misses to memory per 1000 instructions, number of high cost L1 cache writes, number of high cost L2 cache writes, number of retried conditional stores, number of L1 cache modified interventions, number of L1 cache shared interventions, number of L2 cache modified interventions, number of L2 cache shared interventions, percentage of L1 interventions, percentage of L2 interventions, percentage of modified interventions, percentage of shared interventions, number of DTLB misses, number of DTLB search cycles, number of ITLB misses, number of ITLB search cycles, average cycles per DTLB miss, average cycle per ITLB miss, number of CIU paradox, number of CIU load requests, number of CIU shared interventions, number of CIU shared intervention from two cores, number of CIU store requests, number of BIU load requests, number of BIU store requests, number of cycles, number of data bus beats, percentage of BIU loads, percentage of BIU stores, bytes transferred across FSB, and/or MB/s across FSB.

Figure 5:
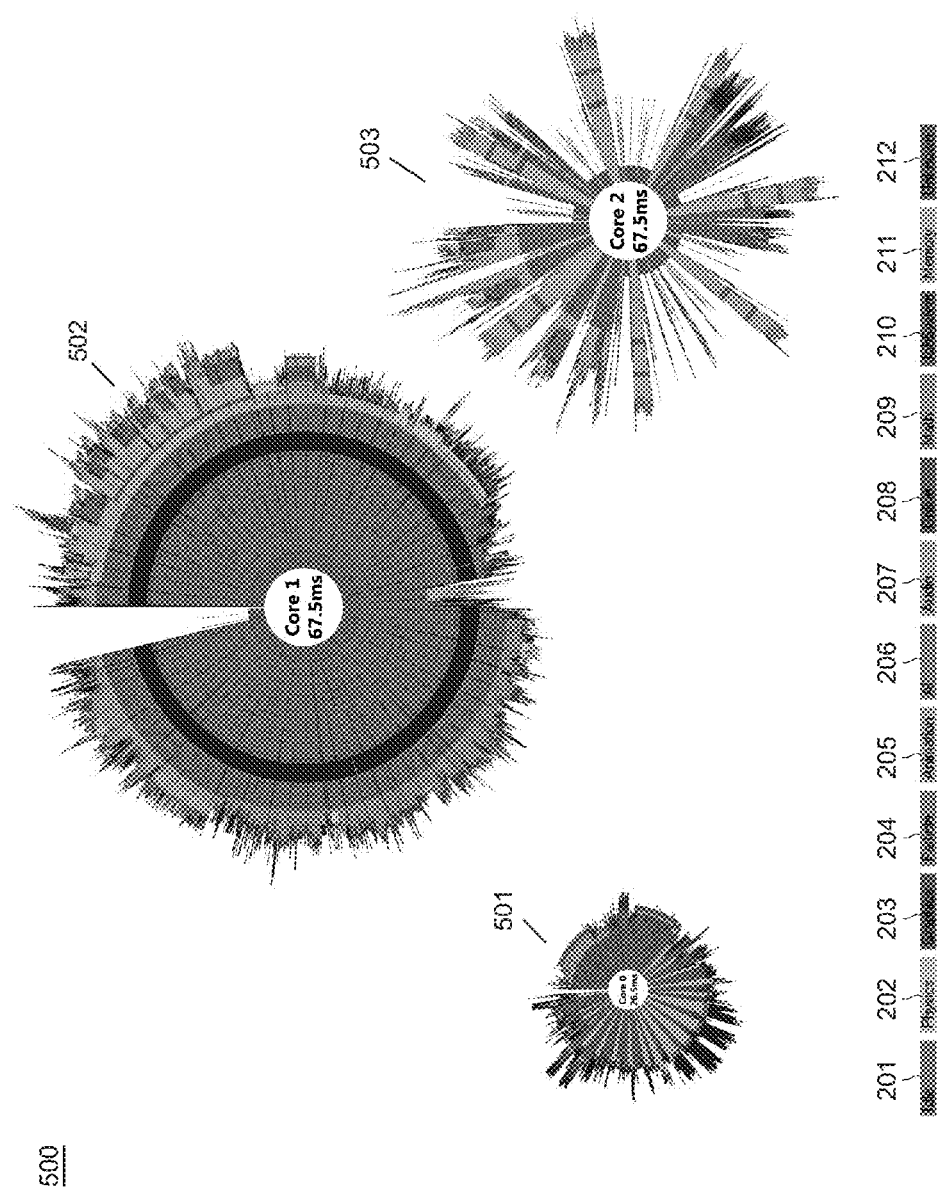
FIG. 5 shows non-limiting example graphs.
Figure 6:
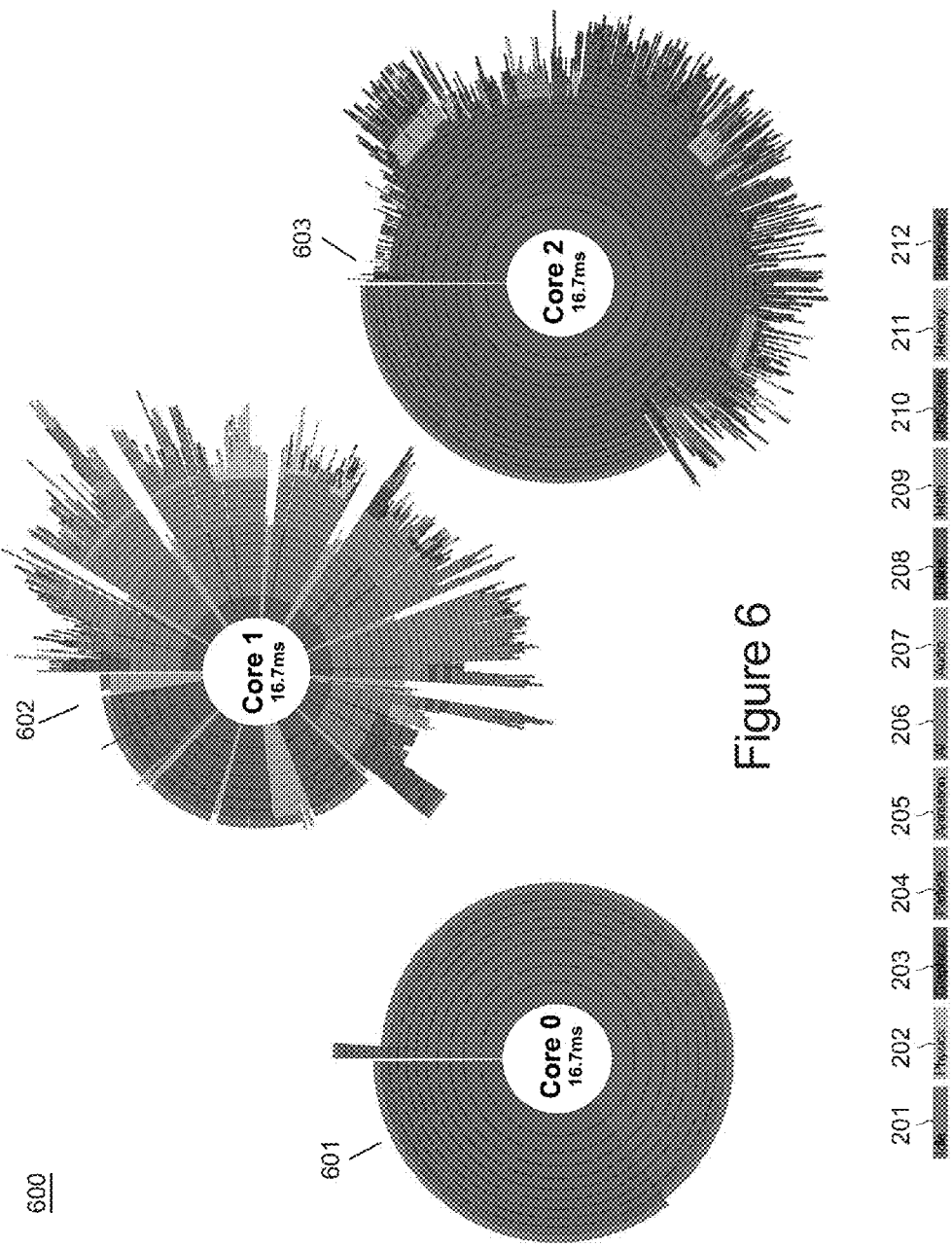
FIG. 6 shows non-limiting example graphs.

FIGS. 5 and 6 show other non-limiting example Sunburst Icicle Graphs 500 and 600 with execution shown at different cores of a multi-core processor. FIGS. 5 and 6 show three software system Sunburst Icicle Graphs, one for each CPU core, all running a single multi-core program. The natural repeating rate of work on each core differs, with the rate displayed on the inside of each graph as well as the rate reflected in the size of the graph.

In the example shown in FIG. 5, graphs 501-503 show execution of various functions at different cores 0-2. These displays also depict an amount of time for the graph to make one revolution. For example, graph 501 (at core 0) requires 26.5 ms to take one whole revolution starting and ending at the 12 o'clock position. Likewise, graphs 502 and 503 (at cores 1 and 2) require 67.5 ms to take one whole revolution starting and ending at the 12-o'clock position. As can be seen in FIG. 5, different cores will take on different loads of certain classes of execution. For example, core 0 executes primarily graphics and animation processing where core 2 executes primarily audio processing. Graph 502 shows that core 1 may be the "main" core executing the main processing loop (as many portions of the graph 502 are classified as "unknown") with outlying portions of the call stack executing certain classes of code (e.g., AI, animation). It should be appreciated that a "fatter core" could mean the core has a deeper call stack compared to other cores and does not necessarily mean that the core does more work than another core. Likewise, if a core has a different overall size that could indicate that the core has a different execution rhythm when compared to another core.

FIG. 6 also shows three graphs 601-603 for execution along respective cores 0-2. Similar to FIG. 5, the graphs show the time for each core to make one revolution starting and ending at the 12 o'clock position. In this example, each core 0-2 requires 16.7 ms to perform one revolution. Also similar to FIG. 5, graphs 601-603 also show the various types of execution at each core. In this example, core 1 (graph 602) is shown as executing a variety of functions including, but not limited to, AI, physics, audio, and graphics processing. This execution could be indicative of running a main software loop (e.g., a main game loop). Likewise core 2 (graph 603) is shown executing primarily graphics processing where core 0 (graph 601) is shown primarily being idle in execution. Graph 601 could be indicative of some process tying up the execution, such as an I/O or audio interrupt, or could be indicative of software not running a particular feature normally executed by the core (e.g., network game mode when there is no network connectivity).

The visualizations shown in FIGS. 2-6 depict the successive effect of each method applied on a data set. As discussed above, FIG. 2A, for example, shows the effect of how Partial String Matching classifies a subset of the functions within the Icicle Graph, FIG. 2B. shows the effect of the Correlation method applied after Partial String Matching, and FIG. 2C shows the effect of the Propagating Belief method (e.g., applied after the first two methods). The graphs combine function software system membership data, time interval frame data, and call stack data in the form of an Icicle Graph (e.g., FIGS. 2A-C), then distorted using polar coordinates into a Sunburst Graph (e.g., FIGS. 3-6). These graphs provide certain benefits in that the entire graph is a fingerprint of the code execution which is unique compared with all other programs. Furthermore, there are no numbers, yet percentages are easy to estimate since the colored portions are similar to a pie graph, and patterns and repeating patterns can easily be observed. Moreover, data in the outer tips of an icicle graph are easier to discern since their shape is less like a thin sliver and more square, making color and position easier to see, and the displays are more fun to look at and more visually appealing. The processes detailing how these beliefs are defined is described in further detail below.

Figure 7:
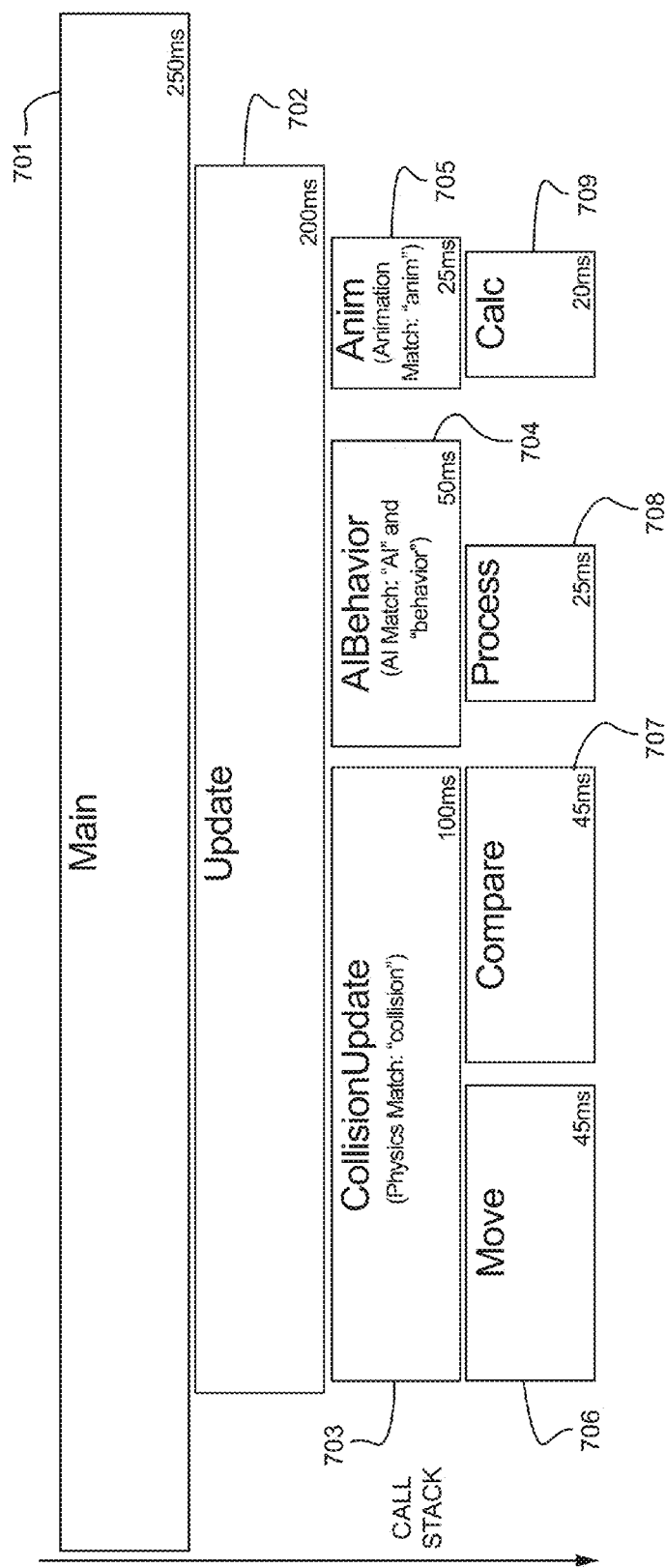
FIG. 7 illustrates a non-limiting example of how functions can be identified as belonging to particular systems as a result of partial string matching.

FIG. 7 illustrates a non-limiting example of how functions can be identified as belonging to particular systems as a result of partial string matching. The example shown in FIG. 7 depicts 9 functions listed as Main 701, Update 702, CollisionUpdate 703, AIBehavior 704, Anim 705, Move 706, Compare 707, Process 708, and Calc 709.

As explained above, the partial string matching technique will attempt to match the strings of both the function name as well as the incorporated parameters/arguments to a particular classification. For example, the function Collision-Update 703 was identified as belonging to the Physics system because the word "collision" matched a portion of the function name. The function AIBehavior 704 was identified as belonging to the Artificial Intelligence system because the word "AI" and the word "behavior" matched a portion of the function name. The function Anim 705 was identified as belonging to the Animation system because the word "anim" matched a portion of the function name.

The times listed in each function also, in a non-limiting example, show the respective run times each function took to execute. Furthermore, the non-limiting example shown in FIG. 7 also shows the respective call stack for the functions going from top to bottom. For example, the function Main 701 accesses/calls Update 702, Update 702 accesses/calls CollisionUpdate 703, AIBehavior 704, and Anim 705, and each of these three functions respectively accesses/calls Move 706, Compare 707, Process 708, and Calc 709. Each function can also list the respective run times that the particular function took to complete execution.

Figure 8:
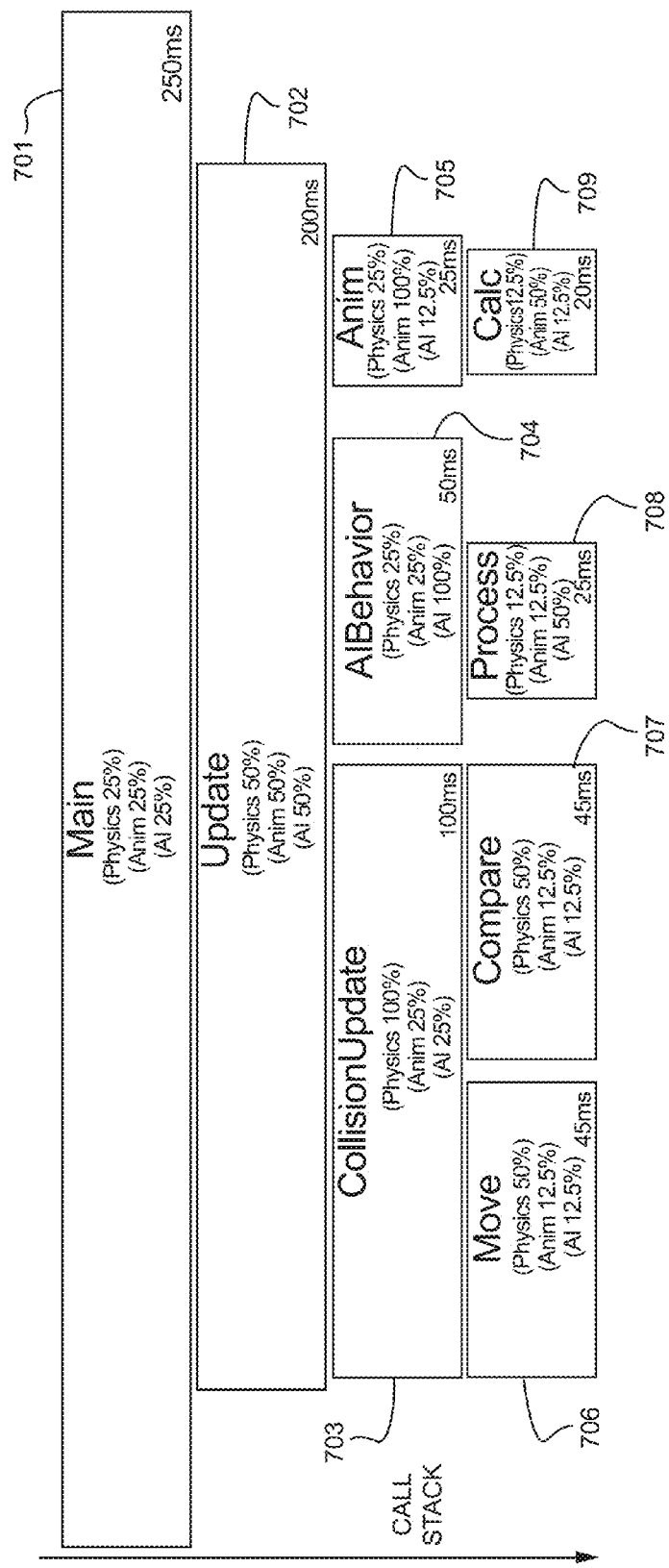
FIG. 8 shows a non-limiting example of how belief can be propagated through a call tree using distance attenuation.

FIG. 8 shows a non-limiting example of how belief can be propagated through a call tree using distance attenuation. In FIG. 8, the positive function matches from FIG. 7 are represented as having 100% belief that they belong to particular systems. That belief is then propagated through the call tree by discounting the belief by 50% each time it is propagated. It should be appreciated that the belief can be discounted by other percentages and thus 50% is non-limiting.

In the example shown in FIG. 8, CollisionUpdate 703 was believed as 100% belonging to the Physics classification. Thus, those functions that neighbor CollisionUpdate 703 in the upward and downward direction in the call stack will have an association of 50% Physics classification (i.e., 50% of 100%). As such, Update 702, Move 706, and Compare 707 will all have 50% Physics classification as they directly neighbor CollisionUpdate 703. This association will be decreased 50% further up/down the call stack as shown, for example, by Main 801 only have 25% Physics classification (i.e., 50% of 50%). These same examples are shown and apply for functions neighboring AIBehavior 704 and Anim 705. In addition to listing the run times for each function, each function can also list the respective percentage of belief for one or more classifications.

It should be appreciated that the "belief" could constitute a score (or belief score). For example, the belief score could be represented by a numerical value within a range of values (e.g., 0 to 100) or could also be represented by a percentage value (e.g., 0% to 100%). Of course, the technology envisions a variety of ways in which the belief score can be represented and these examples are non-limiting.

Figure 9:
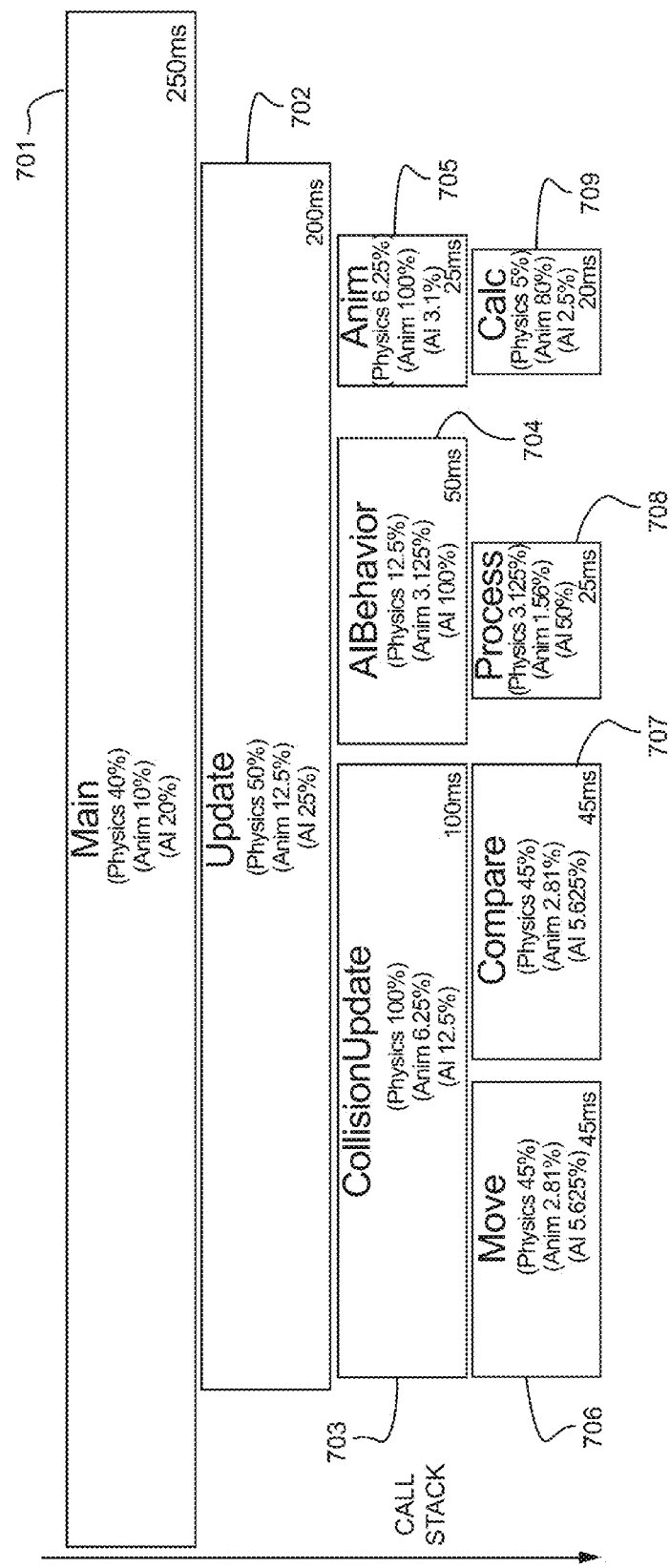
FIG. 9 shows a non-limiting example of how belief can be propagated through a call tree using execution times to attenuate the belief.

FIG. 9 shows a non-limiting example of how belief can be propagated through a call tree using execution times to attenuate the belief. The positive function matches from FIG. 7 are represented as having 100% belief that they belong to particular systems. That belief is then propagated through the call tree by discounting the belief by the percent of similarity in execution times that the two functions share. For example, since the Update 702 function takes 200 ms and the AIBehavior 704 function takes 50 ms, the Physics belief from Update 702 function is multiplied by 50/200 or 0.25 when it propagates to the AIBehavior 704 function. Thus, AIBehavior 704 is given a Physics belief of 50%*0.25=12.5%.

That is, similar to the process shown in FIG. 8, the belief is propagated based on the proportion of execution time between the child function and its calling parent. For functions that are not attributed to 100% belief, this method propagates belief up/down the call stack relative to the proportionate run times between the two functions. As another example, Update 702 is attributed 12.5% Animation classification because Anim 705 only runs for $⅛^{th}$ the time compared to Update 702 overall run time (i.e., 25 ms/200 ms=0.125, or $⅛^{th}$). This belief is further propagated to CollisionUpdate 703 which runs for 50% of the run time compared to Update 702 (i.e., 100 ms/200 ms=0.5 or ½). Thus, the Animation classification for CollisionUpdate 703 is 6.25% (i.e., 50% of 12.5%). The belief can be propagated in this manner for each function up and down the call stack.

Figure 10:
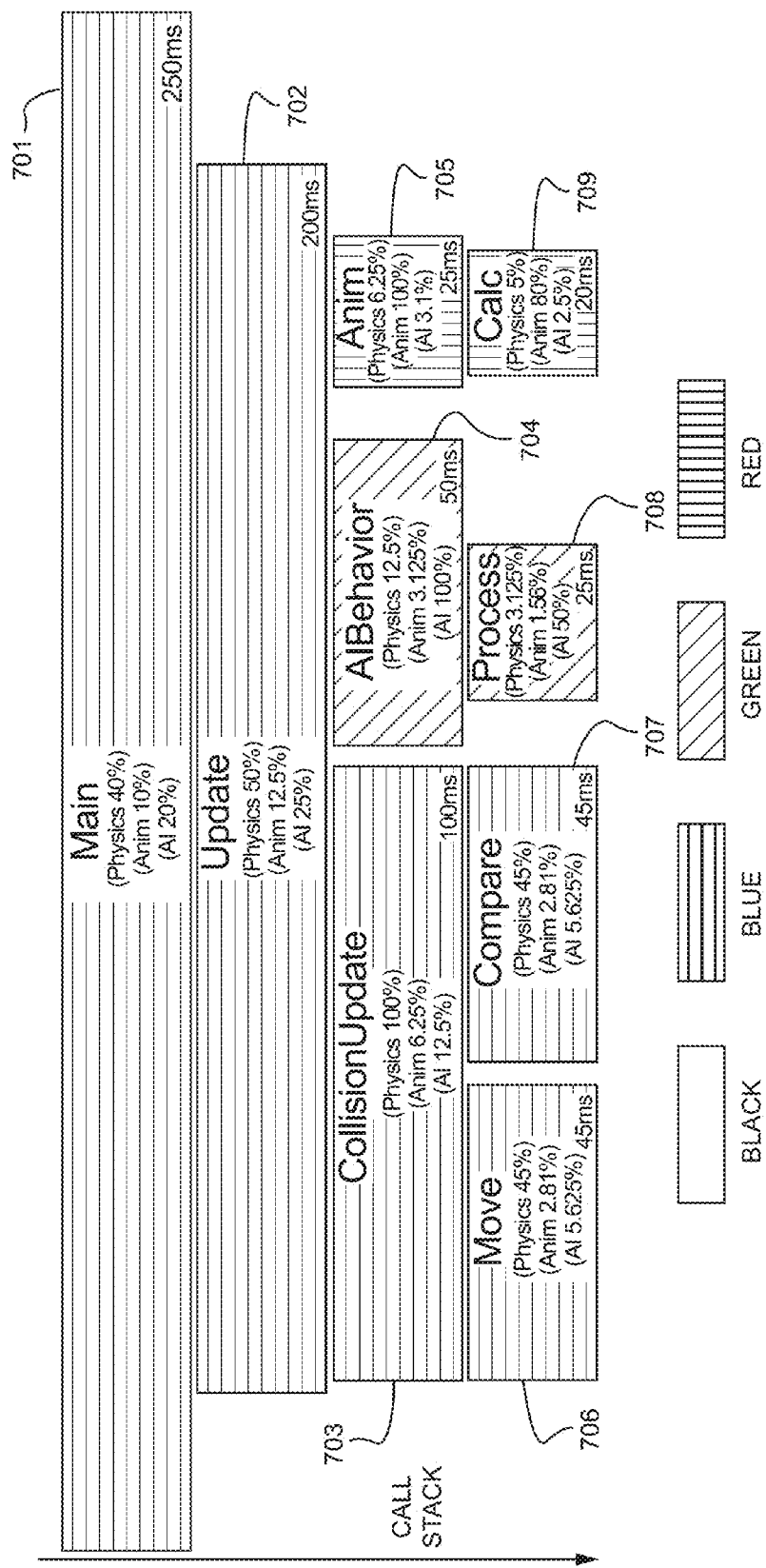
FIG. 10 shows a non-limiting example of how a call tree can be colored by assigning a color for each system.

FIG. 10 depicts a non-limiting example of how a call tree can be colored by assigning a solid color for each system (e.g., blue for Physics, green for AI, and red for Animation).

Each function is colored based on the largest belief value for that function. In the example shown in FIG. 10, Main 701, Update 702, CollisionUpdate 703, Move 706, and Compare 707 are assigned the color blue as the Physics classification is the highest for these functions. Likewise, AIBehavior 704 and Process 708 are colored green as they have the highest association with AI, and Anim 705 and Calc 709 are colored red as they have the highest association with Animation.

Figure 11:
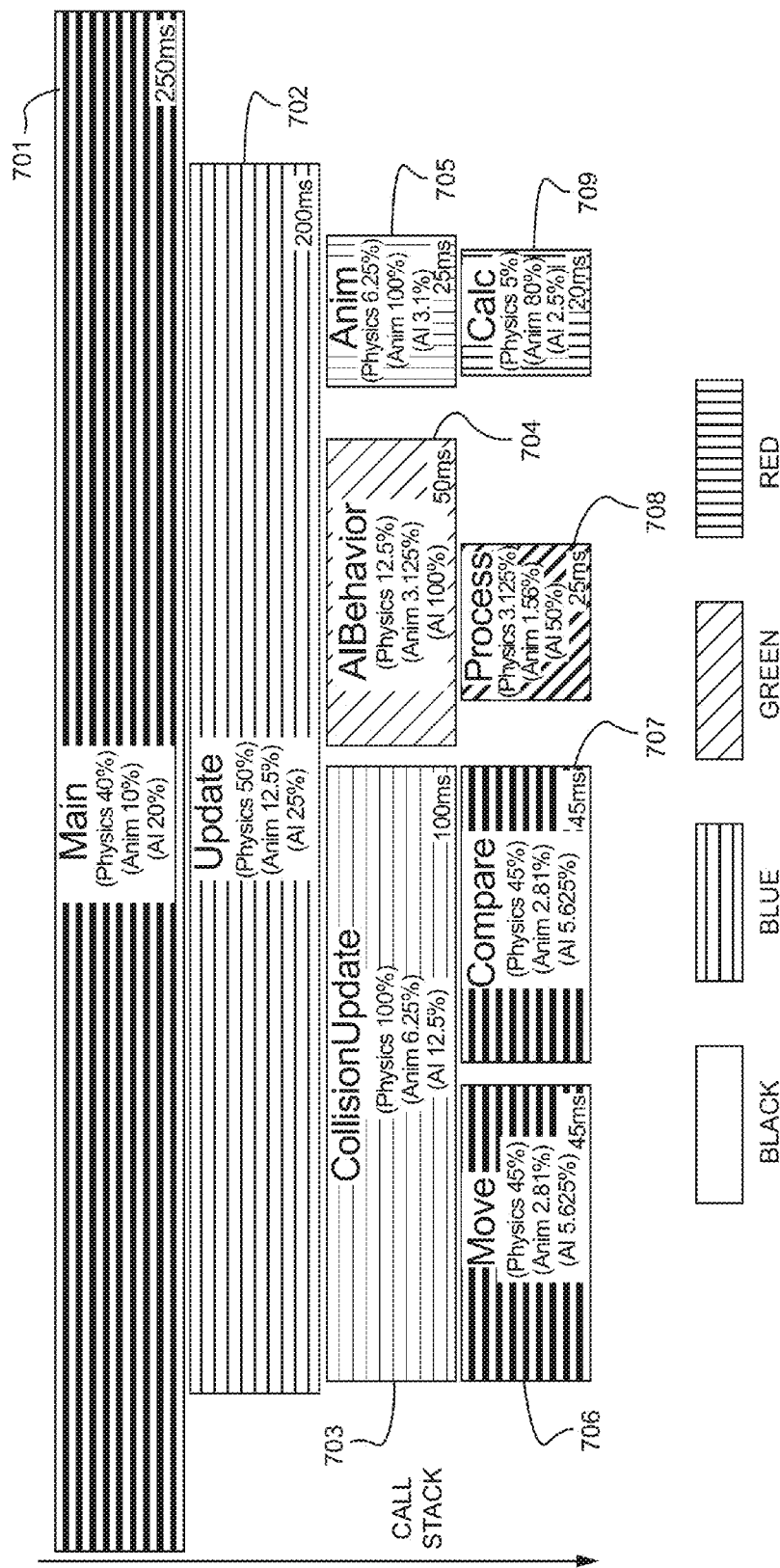
FIG. 11 shows a non-limiting example of how a call tree can be colored by assigning a color for each system.

FIG. 11 shows a non-limiting example of how a call tree can be colored by assigning a solid color for each system (e.g., blue for Physics, green for AI, and red for Animation) and then altering the hue based on association. Each function's color hue is based on the largest belief value for that function and the percentage of that belief controls the brightness of the color. Thus, CollisionUpdate 703 is a bright blue because it belongs to the Physics system with 100% belief, while the function Main 701 is a dark blue because it belongs to the Physics system with only 40% belief. As a non-limiting example, CollisionUpdate 703, AIBehavior 704, and Anim 705 would have the brightest colors as they have the highest level of belief to a particular class where, for example, Main 701 would have relatively darker colors as it does not have a majority belief to any particular class. Coloring the display in this manner helps visually identify how close each neighboring function is believed to be affiliated with a particular class.

Figure 12:
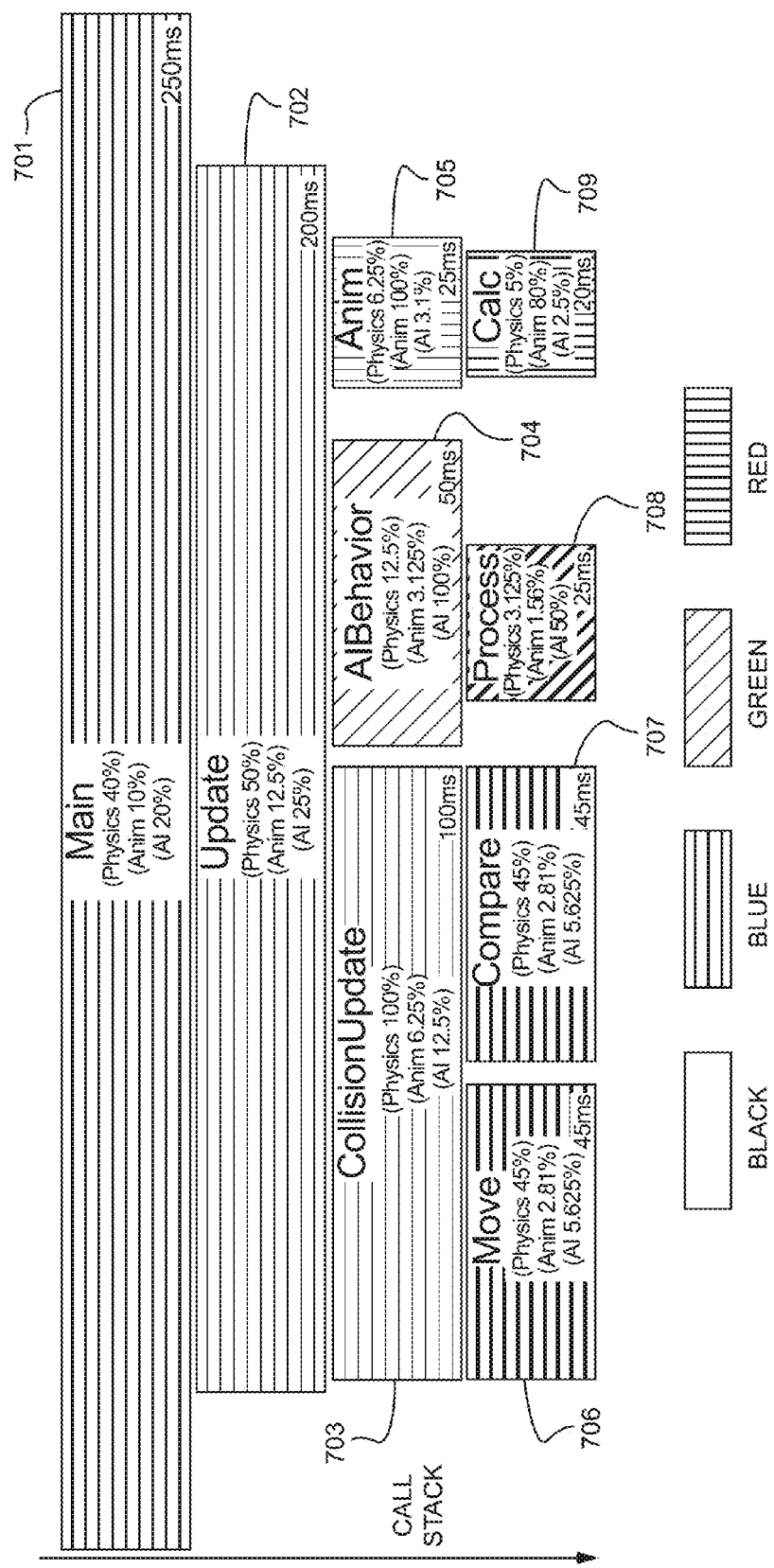
FIG. 12 illustrates a non-limiting example of coloring a call tree using an additive color gradient based on all beliefs.

FIG. 12 illustrates a non-limiting example of coloring a call tree using an additive color gradient based on all beliefs. First, a solid color can be assigned for each system (e.g., blue for Physics, green for AI, and red for Animation). Each function can be colored based on the proportion of belief for each system, with each system's colors additively blended to create the final color. For example, the Main 701 function is colored 40% Blue, 10% Red, and 20% Green. This results in the Main 701 function having a dark bluish-green color. Again, this could be indicative of Main 701 overall affiliation as it is not clearly affiliated with one particular classification and thus the resulting color is a non-affiliated dark mixture of colors. Thus, for example, the closer the function gets to being colored entirely black, the less likely the function has an association to any particular class. FIG. 12 thus shows an example of the coloring in FIG. 11, where other colors are effectively "added" to the coloring to introduce a coloring gradient helping to show their particular affiliation with a class.

Figure 13:
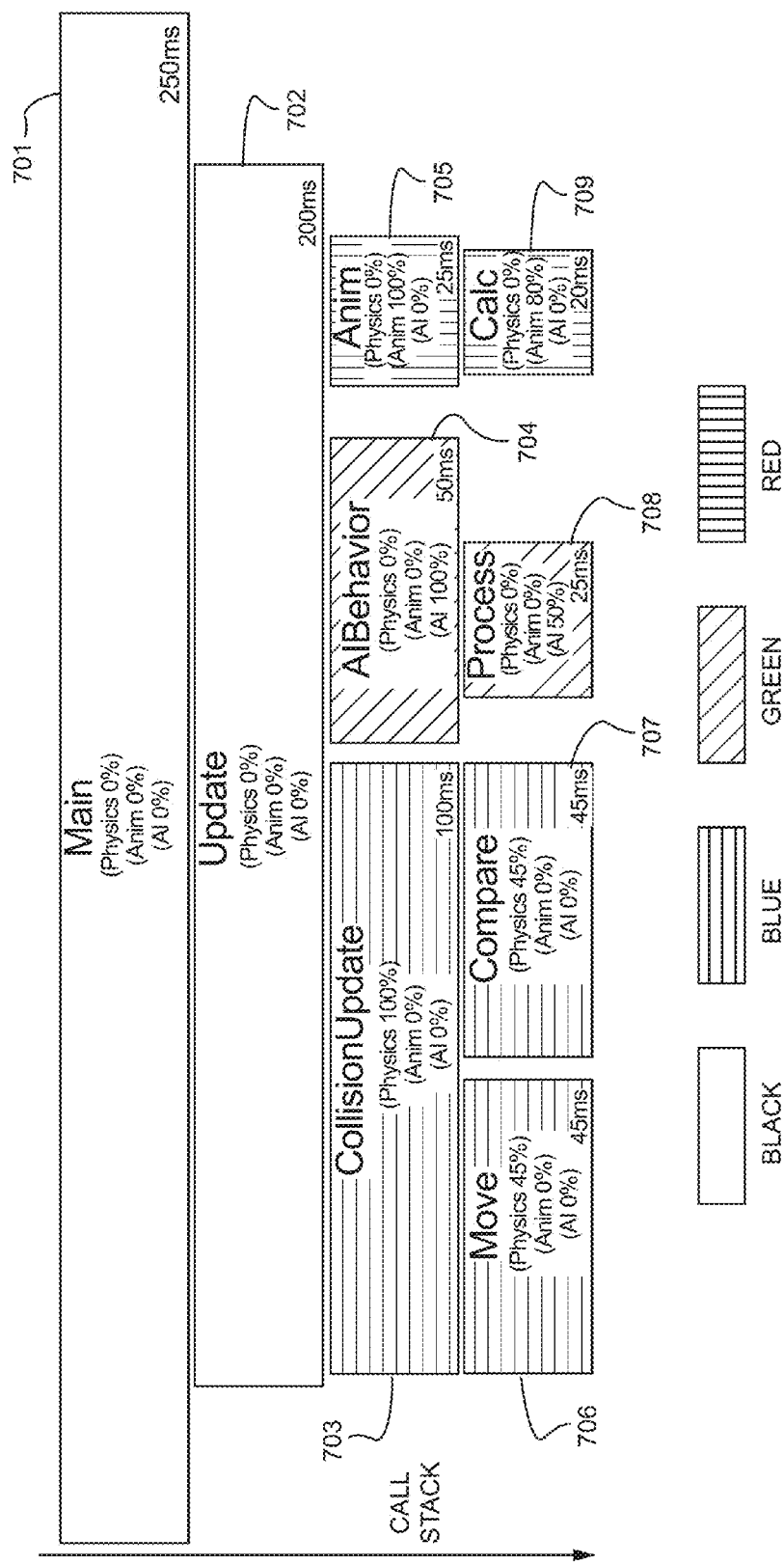
FIG. 13 shows a non-limiting example of how a call tree can be colored using a threshold belief.

FIG. 13 depicts a non-limiting example of how a call tree can be colored using a threshold belief. In particular, the belief propagation in FIG. 13 is restricted with a threshold, such that children must be 60% or more of the execution time of their parent to propagate belief to the parent. Of course, 60% is non-limiting and any threshold value can be employed.

The 60% threshold in this example resulted in zero propagation upward from the CollisionUpdate 703 function, the AIBehavior 704 function, and the Anim 705 function. For example, Update 702 has a 50% physics affiliation which is less than 60% of the total affiliations (i.e., 50% physics/(50% physics+12.5% animation+25% AI)=approximately 57%). In contrast, Compare 707 has a 45% physics affiliation which is greater than 60% of the total affiliations for the function (i.e., 45% physics/(45% physics+2.81% animation+5.625% AI)=approximately 84%) and thus would be affiliated with physics classification using this threshold.

In FIG. 13, a solid color is assigned for each system (e.g., blue for Physics, green for AI, and red for Animation). Then, functions are colored based on the largest system belief for each function. The result is a stark figure that is easy to spot distinct systems. FIG. 13 thus helps segregate certain functions that do not have an identifiable affiliation to a particular class. In this example, Main 701 and Update 702 are most likely functions core to the main software loop and would thus be calling child functions of varying classes. Thus, it makes sense that these functions would not have an identifiable affiliation to a particular classification as these functions use a variety of different classes. Likewise, CollisionUpdate 703, Move 706, and Compare 707 are affiliated with physics, AIBehavior 704 and Process 708 are affiliated with AI, and Anim 705 and Calc 709 are affiliated with animation, thus necessitating their various colorings.

FIG. 14 illustrates a non-limiting example of how two unclassified functions can be compared with systems to determine correlations. As a non-limiting example, given all functions classified as belonging to the Physics system, their cumulative execution times are summed per division of time (in this case video refresh frames), as depicted in table 1400. Each unclassified function is analyzed for its execution time per division of time. The unclassified functions are then compared with the Physics system 1401 to determine their Pearson Product-Moment Correlation Coefficient. Unclassified functions that correlate highly are likely to be members of the Physics system 1401 (in this case the GetTrajectory 1402 function, but not the CalcAngle 1403 function).

FIG. 14 thus shows correlation between a particular system and a given function. As can be seen in FIG. 14, the GetTrajectory 1402 function appears almost in harmony with the Physics system 1401. For example, between frames 1 and 2, GetTrajectory 1402 drops in run time the same amount as Physics system 1401 (i.e., 50%). The same can be said for the drop between frames 2 and 3 (i.e., 50%). CalcAngle 1403, on the other hand, appears almost out of harmony from Physics system 1401. For example, while Physics system 1401 drops 50% in run time between frames 1 and 2, CalcAngle 1403 has no change. It thus makes sense that CalcAngle 1403 is most likely not affiliated with Physics system 1401 where GetTrajectory 1402 is affiliated with Physics system 1401.

Figure 15:
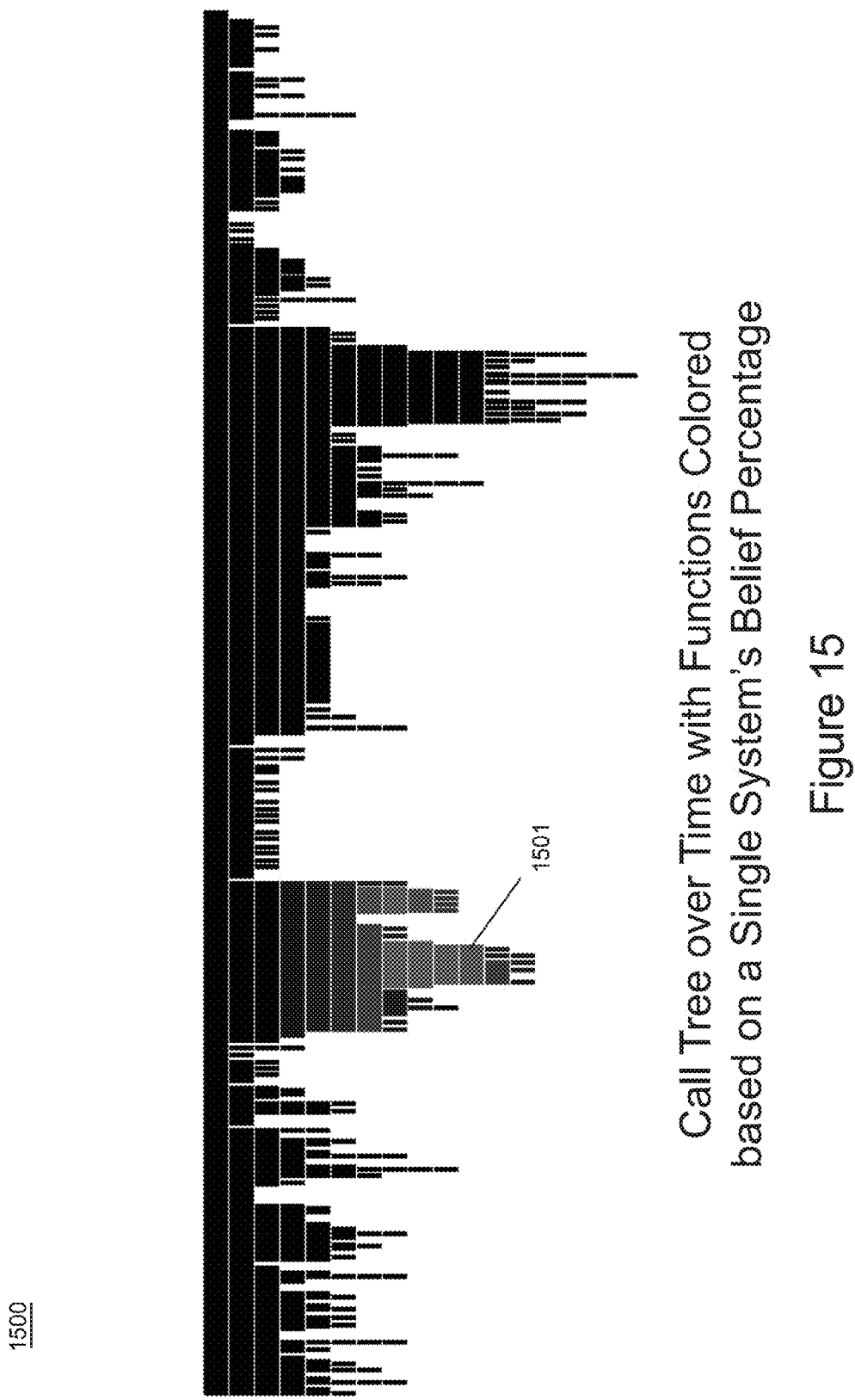
FIG. 15 shows a non-limiting example of how a large call tree over time can be colored.

FIG. 15 shows a non-limiting example of how a large call tree 1500 over time can be colored with functions colored based on a single system belief percentage. If the call tree depicts a single frame of execution, the coloring helps determine what part of the frame and what part of the call stack was dedicated to a particular system, such as Physics or such. In the example shown in FIG. 15, Physics 1501 classification is shown in the call tree 1500 as a heat map depicting what part of the frame was dedicated to this classification.

Figure 16:
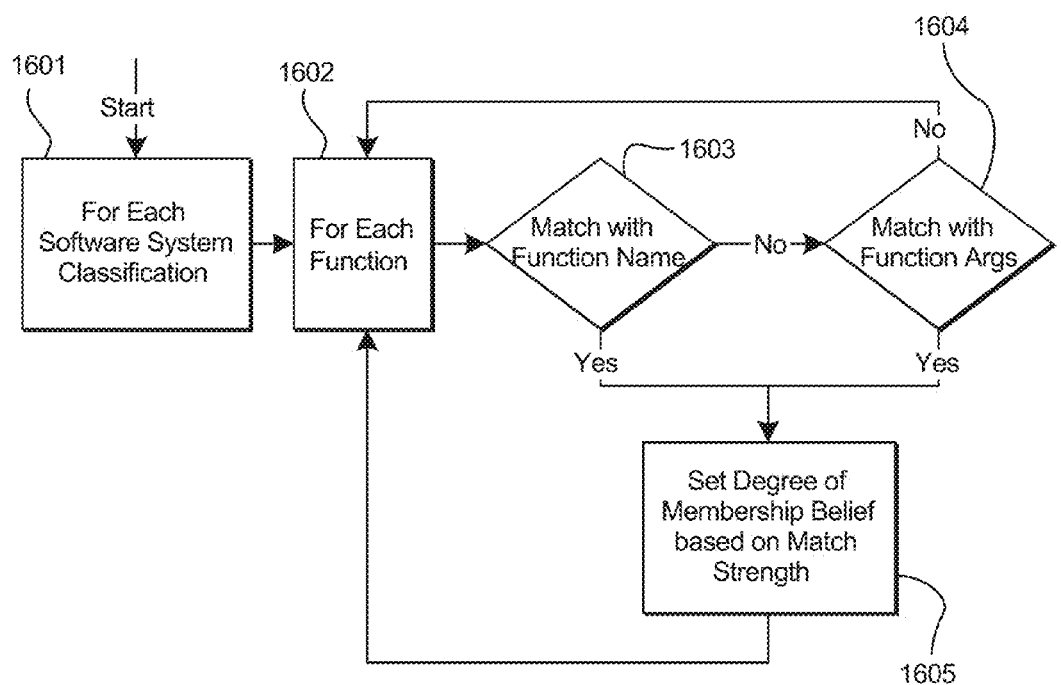
FIG. 16 depicts a non-limiting example flowchart of a process for classifying software.

FIG. 16 depicts a non-limiting example flowchart of a process of assigning initial belief to functions through partial string matching. For each software system classification 1601 (such as Physics, Graphics, Audio, etc), the process loops through each function 1602 trying to find a partial string match to the software system classification in either the function name or the function arguments. The process determines if there is a match within the function name 1603 or the parameter/argument 1604, and then sets a degree of membership belief based on the match strength 1605. If there is no match, then the process proceeds with the next function. This initial process helps identify the first set of functions that are most likely affiliated with a particular classification.

Figure 17:
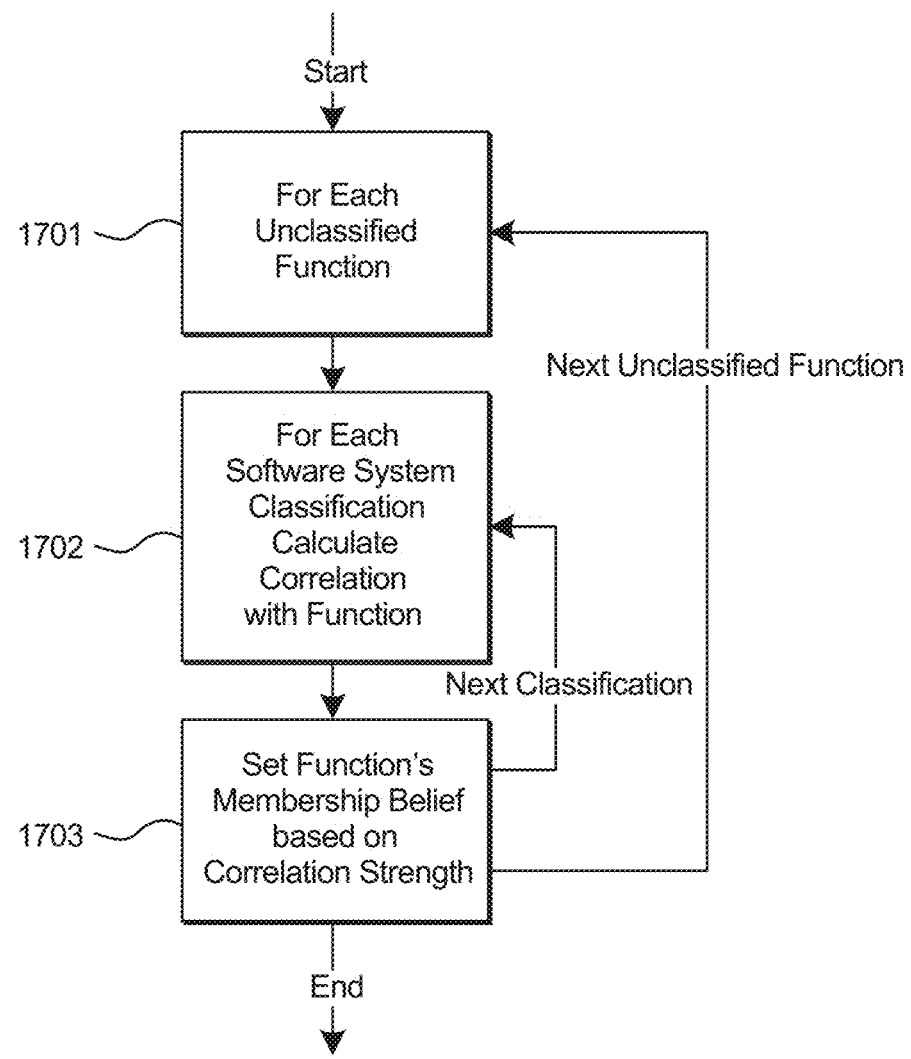
FIG. 17 illustrates a non-limiting example flowchart of a process for classifying software.

FIG. 17 illustrates a non-limiting example flowchart of a process for setting software system classification membership belief based on correlation. For each unclassified function 1701 (i.e., not classified in the process depicted in FIG. 16), the process loops through each software system classification and computes the correlation with the unclassified function 1702. The process sets the function membership belief based on the correlation strength 1703.

Figure 18:
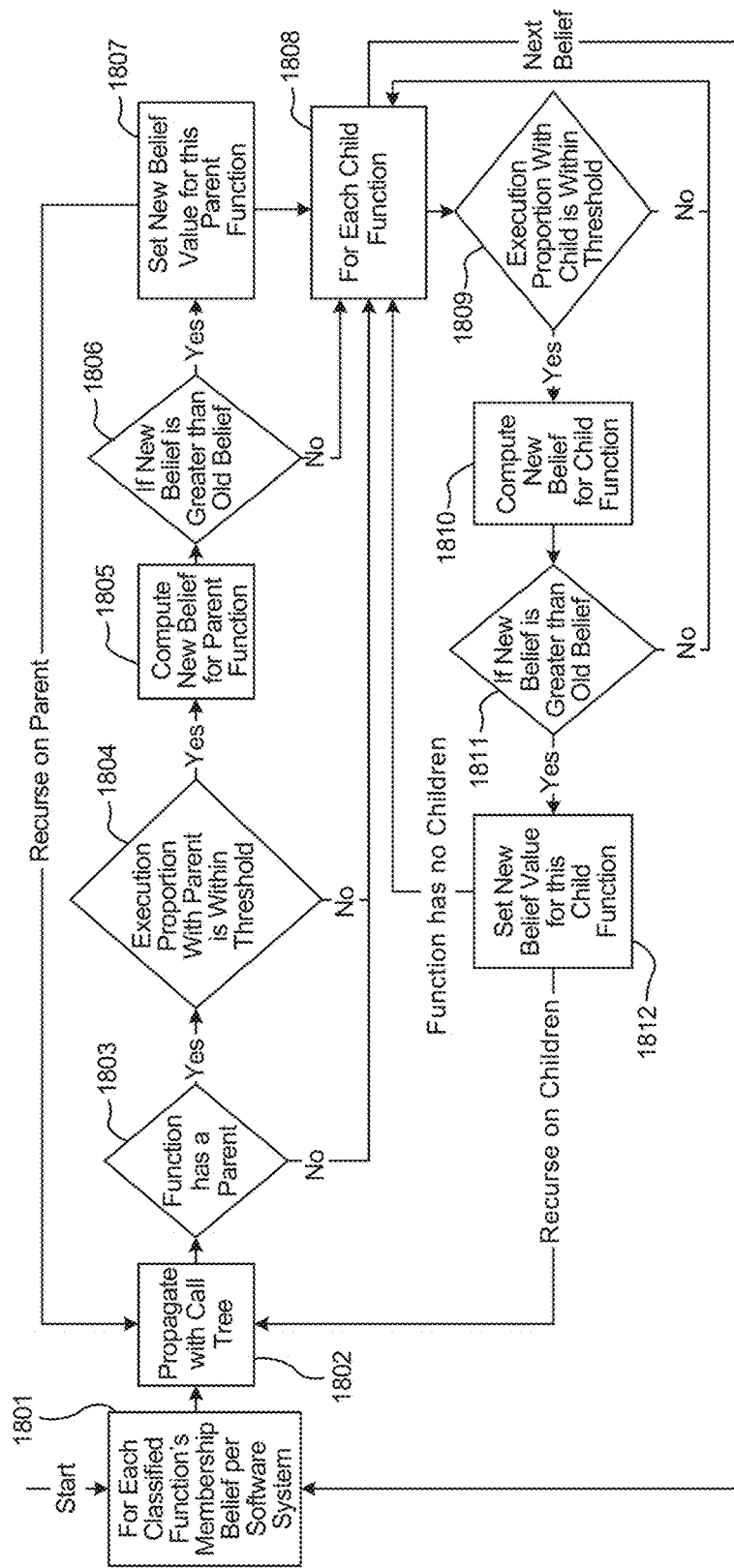
FIG. 18 depicts a non-limiting example flowchart of a process for classifying software.

FIG. 18 depicts a non-limiting example flowchart of a process of propagating belief from classified functions (i.e., functions that were not classified using the processes describes in FIGS. 16 and 17). For each classified function membership belief per software system 1801, propagate the belief within the call tree 1802. If a classified function has a parent 1803 and the execution proportion with the parent is within a predetermined threshold 1804, then the process computes a new belief for the parent function 1805. If this new belief is greater than the old belief for this software system 1806, then this parent function is assigned this new belief value 1807. If this parent function has a parent of its own, then it recurses on its parent 1802. Otherwise, if the execution proportion with the parent is not within a threshold, and if the belief is not greater, the parent function does not have a parent of its own, or execution is done recursing through the parent, then execution proceeds to each child of the original function 1808. For each child function 1808, if the execution proportion with the child is within a predetermined threshold 1809, then the process computes a new belief for this child function 1810. If the new belief is greater than the old belief 1811, than this child function is assigned this new belief value 1812. If the child function has children of its own, then it recurses on its children 1808. Otherwise, if the execution proportion with the child is not within a threshold, and if the belief is not greater, the child function does not have children of its own, or execution is done recursing through the children, then execution proceeds to the remaining children. Once all children have been considered, then execution proceeds to the next classified function software system belief. Once all software system beliefs in a classified function have been considered, then execution proceeds to the next classified function.

While the technology has been described in connection with what is presently considered to be the most practical and preferred embodiment, it is to be understood that the technology is not to be limited to the disclosed embodiment, but on the contrary, is intended to cover various modifications and equivalent arrangements.

At least the following is claimed:

1. A system for classifying software systems in a code execution profile, comprising:
a processing system having at least one processor, the processing system configured to:
assign functions based on a first belief score, executing in a running program, to a software system classification, that describes a grouping to which the executing function is associated, determined by partial string matching at least a portion of a function name and/or function parameter to one or more stored function names, the first belief score being higher depending upon match position within the function name and/or function parameter;
calculate a correlation between unclassified functions to one or more functions classified by the partial string matching to determine one or more second belief scores for at least each unclassified function;
propagate the one or more second belief scores, based on a function execution time during a specified time period, to determine one or more third belief scores for at least each unclassified function;
assign each unclassified function to the software system classification based on a highest belief score from the one or more third belief scores; and
generate a display showing function execution over a period of time with the respective functions being displayed to correspond to their assigned software system classification without a need for mark-up of original source code of the running program.

2. The system of claim 1, wherein the display is a graph showing function execution over time along a first axis and call stack depth along a second axis.

3. The system of claim 2, wherein the graph is color coded to correspond to different portions of the graph representing respective software system classifications.

4. The system of claim 1, wherein the display is a graph showing function execution over time along a radial axis with call stack depth extending outward along the radial axis.

5. A system for profiling software, comprising:
a processing system having at least one processor, the processing system configured to:
assign a first set of functions, executing in a running program, to a software system classification, that describes a grouping to which the executing function is associated, based on a first belief score determined by partial string matching at least a portion of a function name and/or function parameter to one or more stored function names;
calculate a correlation between a second set of functions, executing in the running program, to one or more functions in the first set of functions to determine one or more second belief scores that are propagated among at least the second set of functions;
assign each function in the second set of functions to the software system classification based on a highest belief score from the one or more second belief scores; and
generate a display showing function execution over time with the respective functions being displayed to correspond to their assigned software system classification without a need for mark-up of original source code of the running program.

6. The system of claim 5, wherein the processing system calculates the correlation between the second set of functions to the one or more functions in the first set of functions based at least in part on the relationship between the functions.

7. The system of claim 5, wherein the processing system calculates the second set of functions to the one or more functions in the first set of functions based on relationships between the functions, and propagates the one or more second belief scores based on the relationships between the functions, the one or more second belief scores decreasing the farther the relationship is between the functions.

8. The system of claim 5, wherein the display depicts function execution over time along a first axis and call stack depth along a second axis.

9. The system of claim 5, wherein the display depicts function execution over time along a radial axis with call stack depth extending outward along the radial axis.

10. The system of claim 5, wherein the one or more second belief scores are indicative of a probability that the second set of functions belongs to one or more software system classifications, the one or more second belief scores calculated, in part, based on a relationship of the second set of functions to the one or more functions in the first set of functions, the first set of functions executing in association with the second set of functions along a call stack depth.

11. The system of claim 5, wherein the software system classification includes at least one selected from a group comprising an idle state, a physics system, a graphics system, a particle system, an animation system, an artificial intelligence (AI) system, an audio system, an online system, a math system, a job system, a memory system, and/or an unknown system.

12. The system of claim 5, wherein the display further shows function execution over the period of time along different cores of a multi-core processor.

13. A method, implemented using at least one processor, for profiling software, the method comprising:
   assigning a first set of functions, executing in a running program, to a software system classification, that describes a grouping to which the executing function is associated, based on a first belief score determined by partial string matching at least a portion of a function name and/or function parameter to one or more stored function names;
   calculating a correlation between a second set of functions, executing in the running program, to one or more functions in the first set of functions to determine one or more second belief scores that are propagated among at least the second set of functions;
   assigning each function in the second set of functions to the software system classification based on a highest belief score from the one or more second belief scores; and
   generating a display showing function execution over a period of time with the respective functions being displayed to correspond to their assigned software system classification without a need for mark-up of original source code of the running program.

14. The method of claim 13, wherein the one or more second belief scores are determined based on a proximity of relationship between the functions.

15. The method of claim 13, wherein the one or more second belief scores are determined based on a proximity of relationship between the functions, the one or more second belief scores are propagated between functions based on the proximity of relationships, the propagated one or more second belief scores decreasing the farther the relationship is between the functions.

16. The method of claim 13, wherein the display is a graph showing function execution over time along a first axis and call stack depth along a second axis.

17. The method of claim 13, wherein the display is a graph showing function execution over time along a radial axis with call stack depth extending outward along the radial axis.

18. A non-transitory computer-readable storage medium comprising instructions which, when executed by one or more processors of an information processing apparatus, cause the information processing apparatus to:
   assign a first set of functions, executing in a running program, to a software system classification, that describes a grouping to which the executing function is associated, based on a first belief score determined by partial string matching at least a portion of a function name and/or function parameter to one or more stored function names;
   calculate a correlation between a second set of functions, executing in the running program, to one or more functions in the first set of functions to determine one or more second belief scores that are propagated among at least the second set of functions;
   assign each function in the second set of functions to the software system classification based on a highest belief score from the one or more second belief scores; and
   generate a display showing function execution over a period of time with the respective functions being displayed to correspond to their assigned software system classification without a need for mark-up of original source code of the running program.

19. The non-transitory computer-readable storage medium of claim 18, wherein the one or more second belief scores are determined based on a proximity of relationship between the functions.

20. The non-transitory computer-readable storage medium of claim 18, wherein the one or more second belief scores are determined based on a proximity of relationship between the functions, the one or more second belief scores are propagated between functions based on the proximity of relationships, the propagated one or more second belief scores decreasing the farther the relationship is between the functions.

21. The non-transitory computer-readable storage medium of claim 18, wherein the display is a graph showing function execution over time along a first axis and call stack depth along a second axis.

22. The non-transitory computer-readable storage medium of claim 18, wherein the display is a graph showing function execution over time along a radial axis with call stack depth extending outward along the radial axis.

* * * * *